US012641030B2

(12) United States Patent
Jones et al.

(10) Patent No.: US 12,641,030 B2
(45) Date of Patent: May 26, 2026

(54) SYSTEMS AND METHODS FOR DATA TRANSMISSION ACROSS UNRELIABLE CONNECTIONS

(71) Applicant: DEJERO LABS INC., Waterloo (CA)

(72) Inventors: George Richard Jones, Waterloo (CA); Imad Azzam, Waterloo (CA); David Pui Keung Sze, Waterloo (CA); Jonathon Oberholzer, Waterloo (CA)

(73) Assignee: DEJERO LABS INC., Waterloo (CA)

( * ) Notice: Subject to any disclaimer, the term of this patent is extended or adjusted under 35 U.S.C. 154(b) by 495 days.

(21) Appl. No.: 17/928,504

(22) PCT Filed: May 28, 2021

(86) PCT No.: PCT/CA2021/050732
§ 371 (c)(1),
(2) Date: Nov. 29, 2022

(87) PCT Pub. No.: WO2021/237370
PCT Pub. Date: Dec. 2, 2021

(65) Prior Publication Data
US 2023/0208571 A1      Jun. 29, 2023

Related U.S. Application Data

(60) Provisional application No. 63/032,180, filed on May 29, 2020.

(51) Int. Cl.
H04L 47/2483      (2022.01)
H04L 1/1867      (2023.01)
(Continued)

(52) U.S. Cl.
CPC .......... H04L 47/2483 (2013.01); H04L 1/189 (2013.01); H04L 43/0805 (2013.01); H04L 41/0893 (2013.01)

(58) Field of Classification Search
CPC ............. H04L 47/2483; H04L 41/0893; H04L 43/026; H04L 45/245; H04L 45/24;
(Continued)

(56) References Cited

U.S. PATENT DOCUMENTS 11,902,018 B2 *   2/2024   Del Carpio Vega ........................
                                                  H04L 47/2441
2009/0147678 A1 *   6/2009   Xhafa ..................... H04L 47/10
                                                  370/232
(Continued)

FOREIGN PATENT DOCUMENTS

JP        2020502948 A      1/2020
WO        2018/112657 A1      6/2018
(Continued)

OTHER PUBLICATIONS

Canadian Intellectual Property Office (CIPO), International Search Report and Written Opinion to PCT/CA2021/050732, Aug. 6, 2021.
(Continued)

*Primary Examiner* — Jeffrey M Rutkowski
(74) *Attorney, Agent, or Firm* — Norton Rose Fulbright Canada LLP

(57) ABSTRACT

An improved data packet communications approach is described that is adapted for communications across unreliable connections. In particular, the approach can be implemented as systems and methods for a networked router device configured to monitor communication characteristics and to group the connections into various tiers based on their communication reliability data. When a new packet is to be communicated, the grouped connections are utilized in aggregate to meet a target transmission reliability probability (e.g., target value or a band of values).

21 Claims, 11 Drawing Sheets

(51) Int. Cl.
H04L 43/0805 (2022.01)
H04L 41/0893 (2022.01)

(58) Field of Classification Search
CPC ..... H04L 1/189; H04L 43/0805; H04L 47/41;
H04L 41/16; H04L 43/10; H04L 47/32;
H04L 45/123; H04L 45/302; Y02D 30/50
See application file for complete search history.

(56) References Cited

U.S. PATENT DOCUMENTS

| | | | |
|---|---|---|---|
| 2012/0224484 A1 | 9/2012 | Babiarz et al. | |
| 2014/0160939 A1* | 6/2014 | Arad ........................ | H04L 45/16 |
| | | | 370/237 |
| 2015/0223098 A1 | 8/2015 | Sze et al. | |
| 2015/0281288 A1* | 10/2015 | Levinson ................ | H04L 47/41 |
| | | | 709/219 |
| 2019/0268219 A1 | 8/2019 | Haapanen | |
| 2020/0098251 A1* | 3/2020 | Laselva .................. | H04L 45/121 |
| 2025/0385872 A1* | 12/2025 | Chung ................ | H04L 47/2483 |

FOREIGN PATENT DOCUMENTS

| | | |
|---|---|---|
| WO | 2018112657 A | 6/2018 |
| WO | 2020024046 A1 | 2/2020 |

OTHER PUBLICATIONS

European Patent Office, European Search Report issued to EP 21813832.9, May 13, 2024.
Canadian Intellectual Property Office, Examiner's Requisition issued to CA 3,178,286, May 6, 2024.
Japanese Patent Office, Office Action issued to JP 2022-572327, dated Feb. 27, 2025.
IP Australia, Examination Report No. 1, issued in AU2021279111, dated Jun. 12, 2025.

* cited by examiner

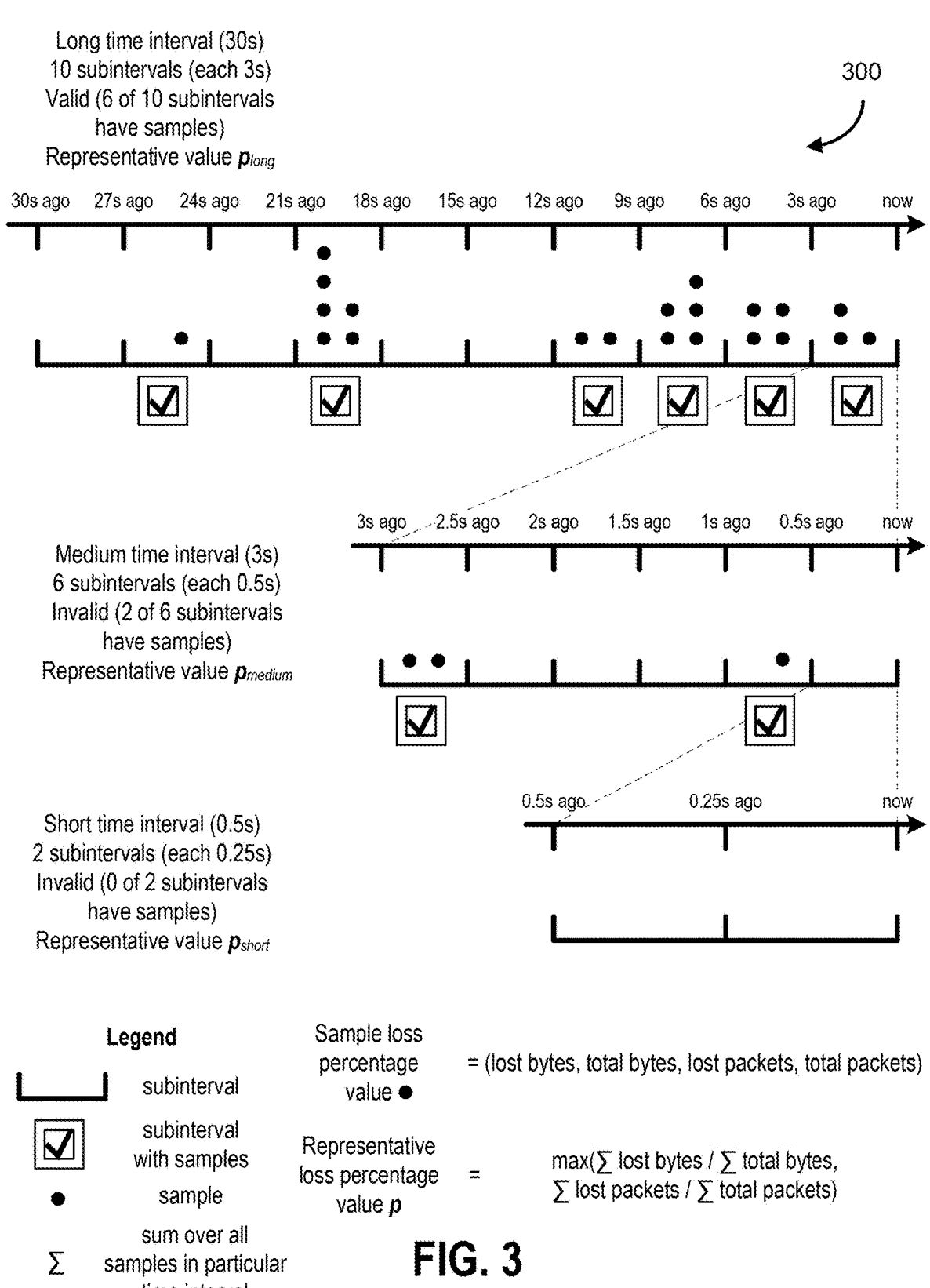

Long time interval (30s)
10 subintervals (each 3s)
Valid (6 of 10 subintervals
     have samples)
Representative value $p_{long}$

300

30s ago  27s ago  24s ago  21s ago  18s ago  15s ago  12s ago  9s ago  6s ago  3s ago  now 3s ago  2.5s ago  2s ago  1.5s ago  1s ago  0.5s ago  now Medium time interval (3s)
6 subintervals (each 0.5s)
Invalid (2 of 6 subintervals
     have samples)
Representative value $p_{medium}$ 0.5s ago  0.25s ago  now Short time interval (0.5s)
2 subintervals (each 0.25s)
Invalid (0 of 2 subintervals
     have samples)
Representative value $p_{short}$

Legend

⌐_⌐  subinterval

☑  subinterval
     with samples

●  sample

Σ  sum over all
     samples in particular
     time interval

Sample loss
percentage          = (lost bytes, total bytes, lost packets, total packets)
value ●

Representative
loss percentage  =   max($\sum$ lost bytes / $\sum$ total bytes,
value $p$                  $\sum$ lost packets / $\sum$ total packets)

FIG. 3

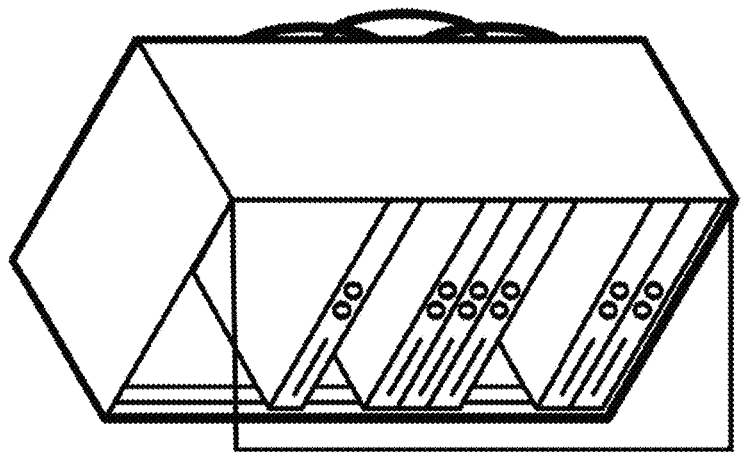
FIG. 9

SYSTEMS AND METHODS FOR DATA TRANSMISSION ACROSS UNRELIABLE CONNECTIONS

CROSS-REFERENCE

This application is a non-provisional of, and claims all benefit including priority to, U.S. Patent Application No. 63/032,180, entitled "SYSTEMS AND METHODS FOR DATA TRANSMISSION ACROSS UNRELIABLE CONNECTIONS", filed May 29, 2020, incorporated herein by reference in its entirety.

This application is related to U.S. application Ser. No. 16/482972, entitled "PACKET TRANSMISSION SYSTEM AND METHOD", filed 21 Dec. 2017, incorporated herein by reference in its entirety.

FIELD

Embodiments of the present disclosure generally relate to the field of data networking, and more specifically, embodiments relate to devices, systems and methods for data communication across unreliable connections.

INTRODUCTION

In cases where networks are unreliable (as expressed in terms of packet loss, latency spikes, or complete (but temporary) loss of connectivity), solutions such as ARQ (automatic repeat request) or SMPTE-2022-7 (sending duplicate packets over multiple channels) can be used to reduce the impact on the overall transmission.

For example, with ARQ, packets sent on the unreliable connections are often lost/late, so they are retransmitted (could be on the same connection or, for a blended system, on a different connection), which has a latency cost and shows up as extreme jitter to the application. With SMPTE-2022-7, since duplicates of every packet are sent over multiple channels, the cost is in bandwidth usage (using 6 connections equals 6 times the bandwidth requirement).

SUMMARY

Blended connectivity systems can utilize more advanced approaches for handling unreliable connections, since they are able to use the strengths and weaknesses of the connections available to them. This allows blended connectivity systems to provide more reliable connectivity overall. For example, as described in U.S. application Ser. No. 14/360372 (granted as U.S. Pat. No. 9,357,427) entitled "DEVICE AND METHOD FOR CHARACTERIZATION AND OPTIMIZATION OF MULTIPLE SIMULTANEOUS REAL-TIME DATA CONNECTIONS" and incorporated herein by reference in its entirety, if a high latency, high throughput satellite connection is paired with a low latency, low throughput terrestrial connection, the terrestrial connection can be used to service ARQ for the satellite connection with little impact on the overall latency and reliability of the system.

Other blended systems might use heuristics or techniques such as machine learning to predict when a connection will become unreliable, and then stop using the connection just before that transition occurs.

An alternate approach is described in some embodiments that may provide efficiency and bandwidth improvements, which may lead to improved cost, reliability, and latency management. The alternate approach is directed to a system that is configured to recognize that the unreliability of a connection can be partial rather than either completely reliable or completely unreliable. It thus is possible to configure the system to efficiently obtain some benefit from unreliable connections. The system is adapted to monitor communication flows over a period of time or to receive communication characteristic data from a third party system, and use this information to coordinate, schedule, or control how data is communicated (e.g., how packets are transmitted or which network connections to use). The information is efficiently tracked in data structures which are maintained over time to reduce an overall number of computational steps required when routing decisions are made (each computational step at run-time impacts performance and when aggregated, can be significant for highly scaled systems sending large volumes of packets).

The approach is a technical, computational solution that can be implemented in the form of a physical data router or other networking device configured for controlling routing of communications of data packets. Other possible types of networking devices can include gateways, switches, bridges, repeaters, hubs, or access points.

The device includes one or more processors operating in conjunction with computer memory, and the one or more processors may be coupled to data storage. Corresponding methods, and non-transitory computer readable media (e.g., diskette, solid state storage, hard disk drive) storing machine-interpretable instructions thereon (e.g., software which, when executed by a computer processor, cause the processor to perform a method described herein in various embodiments). The non-transitory computer readable media can further include rule-based logic, or stored routing tables, which can be referenced to modify routing paths for communicating data packets or data streams.

The approaches described herein are termed "Probabilistic Forward Loss Correction" (PFLC), and are an evolution of the techniques previously described for blended connectivity systems. The evolution involves taking advantage of the properties of the available connections to improve the latency and reliability of the application flows being handled.

The evolved approach is adapted to improve overall efficiency of communications resource usage, which is especially important in situations where there are constrained communications resources (e.g., limited pathways, such as in a rural location), congested communication resources (e.g., many simultaneous users, such as in a sports complex), or cost considerations (e.g., where there are connections available at divergent levels of cost and reliability, such as satellite connections using radio or microwave frequencies where frequency ranges or bands are limited).

A technical benefit of the approaches described herein is that more efficient targeting can be achieved, relative to other technical protocols directed to packet reliability in data communications (e.g., transmissions/receipts).

From a reliability perspective, as described in various embodiments, it may be important to maintain a "goldilocks" level of reliability, where redundant connections are utilized to establish a threshold, range, or a level of reliability. A technical objective is to achieve a level of reliability without over-committing resources, such as bandwidth, needlessly to achieve the target level of reliability desired by the application flows. Challenges with prior blending approaches include using excessive resources to achieve the desired reliability (e.g., SMPTE-2022-7), excessive latency (e.g., naïve ARQ), or excessive loss (e.g., blindly using an unreliable connection and requiring the application to handle lost packets).

Overcommitting resources may yield a reliable transmission for a particular communication but be wasteful in terms of overall resources, and may constrain communications for other users or other communications, or yield an increase in overall communication costs. An example of overcommitted resources includes using network resources to repeatedly send a packet on reliable connections such that a probability of success is at least 99.999%, while the specification only required 95%. Another aspect of waste may relate to lesser utilization of less reliable/unreliable connections. For example, a connection that only transmits at 65% reliability may be completely ignored in other implementations, which is a waste of available communication resources.

The approaches described herein can be used in combination with other correction protocols or approaches for data packet transmission, such as best-effort based transmission (e.g., user datagram protocol (UDP)) and reliable stream-based transmission protocols (e.g., transmission control protocol (TCP)). The device can control communications at different layers of the OSI protocol stack, such as at the application layers, the transport layers, the network layers, the data link layers, or at the physical network layers.

In some embodiments, a network controller device (e.g., a router) is described, the device including a processor coupled to computer memory and data storage, the processor configured to: receive one or more data sets indicative of monitored network communications characteristics; maintain, in a data structure stored on the data storage, a tiered representation of a plurality of connections segregated into a plurality of groups, each group established based at least on a minimum probability associated with a successful communication of a data packet across one or more connections of the plurality of connections residing within the group; and control a plurality of communications of a data packet such that the data packet is sent at least once across one or more connections of the plurality of connections such that, in aggregate, the plurality of communications causes the transmission of the data packet to satisfy a target probability threshold.

In another aspect, the plurality of groups are organized into a plurality of corresponding tiers, each tier representing a number of times the data packet would have to be transmitted across any corresponding connections of the tier to achieve the target probability threshold.

In another aspect, the plurality of communications include re-transmissions across connections of a tier of the plurality of tiers, wherein a number of re-transmissions are based on the number of times the data packet would have to be transmitted across corresponding connections of the tier to achieve the target probability threshold for the corresponding tier. In variant embodiments, retransmission may be conducted on the same connection, but at different times (i.e., separate bursts) to prevent loss of all retransmissions due to a temporary reduction in network reliability (i.e., burst loss due to buffer saturation on an intermediate host in the path).

In another aspect, the re-transmissions are conducted across different connections of the tier.

In another aspect, the plurality of communications includes re-transmissions across connections of different tiers of the plurality of tiers.

In another aspect, an additional group is an indeterminate group established for connections that do not have sufficient data for assessing reliability.

In another aspect, membership of the indeterminate group is periodically modified to classify connections into the plurality of groups.

In another aspect, connections of the plurality of groups is periodically monitored to shift membership into the indeterminate group where connection data is stale or indicative of increased unreliability.

In another aspect, the indeterminate group is utilized for the communications of a data packet using seeded reliability probabilities.

In another aspect, the seeded reliability probabilities are periodically adjusted based on the monitored network communications characteristics.

In another aspect, the connections where a number of transmits or retransmits were required greater than a threshold are transferred into the indeterminate group.

In another aspect, the processor is further configured to periodically transmit data packets across connections in the indeterminate group, the periodic transmission incorporating a backoff timer to reduce an overall system inefficiency.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 3 is a diagram showing a method of creating window sizes and ensuring validity of the sample, according to some embodiments.

FIG. 9 is a diagram depicting a physical computer server rack, according to some embodiments.

DETAILED DESCRIPTION

Figure 1A:
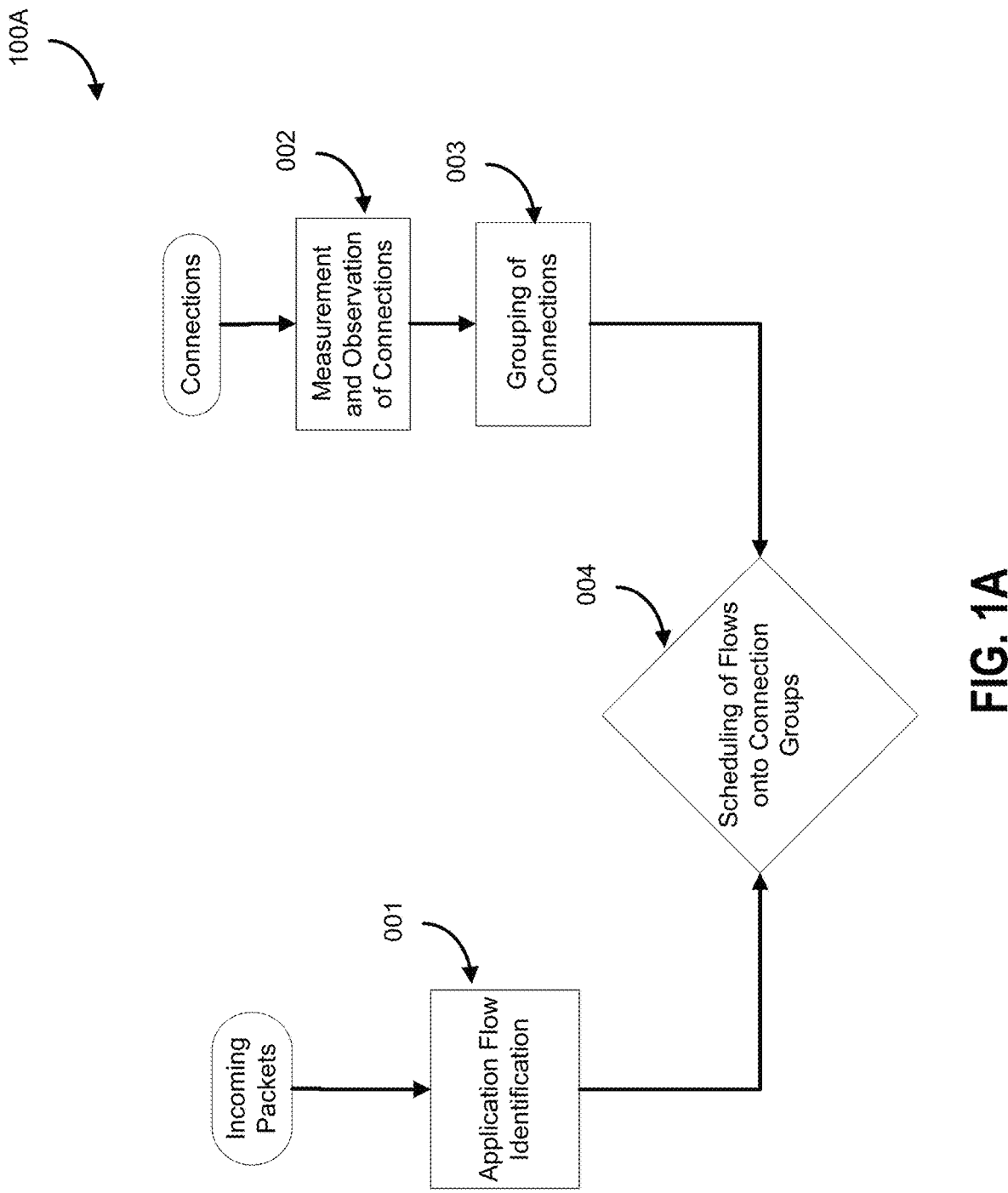
FIG. 1A is a data flow diagram that illustrates the four components that comprise the approach described herein.

FIG. 1A is a data flow diagram 100A that illustrates the four components that comprise the approach described herein. These components are described as logical mechanisms and can be implemented in the form of hardware (e.g., electronic circuits, printed circuit boards, field programmable gate arrays) or software, or embedded firmware. As described in various embodiments herein, some or all of the components can be incorporated into physical network communication devices, such as routers, gateways, switches, bridges, repeaters, hubs, or access points, among others.

In other embodiments, some or all of the components can be incorporated as corresponding network interface controllers, for example, on a server that controls routing, etc., and the output of the device may be a data structure representing instructions for controlling routing, such as a routing table that is periodically or continuously updated to control communications as described herein.

Application Flow Identification 001 specifically handles the determination of flow reliability requirements. For some embodiments this might include techniques such as deep packet inspection (DPI), codified rules and heuristics, machine learning, or user configured hints. For example, a Voice over Internet Protocol (VoIP) application flow might desire 99% reliability for its packets, whereas a temperature sensor reporting periodic observations might only require 80% reliability for its packets.

The purpose of Measurement and Observation of Connections 002 is to determine and track the current and historical reliabilities of the available connections. For example, for some embodiments this might include measurement and historical tracking of packet loss, monitoring of external metrics such as wireless signal strength, taking into account user/administrator hints, or machine learning techniques.

Grouping of Connections 003 groups connections based on their historical, current, or predicted future characteristics. For example, if there are four connections—two with 1% loss, and two with 10% loss—an example embodiment might place the first two connections in one group, and the remaining two connections in another group. Another example embodiment may place a connection that is not similar to any other connection in a group of its own.

Scheduling of Flows onto Connection Groups 004 is intended to be done in an intelligent manner to meet the flow requirements while efficiently using the connections. Using the example values in the previous paragraphs, one possible scheduling combination would be: For each VoIP packet, the system can be configured to transmit once on either of the connections in the 1% loss group, or twice on the connections in the 10% loss group. Either option would achieve or exceed the 99% target reliability, assuming the loss rates are independent and with a uniform distribution. In the example above, the system could also transmit the temperature sensor packets once on any of the available connections. Any of the connections on their own achieve or exceed the 80% reliability target.

The assumption of independence and/or uniform distributions are not necessarily needed in all embodiments. For example, there may be other approaches for overcoming non-uniform distribution and correlated loss rates, such as tracking correlations or interdependencies and deliberately using less-correlated combinations of unreliable connections, or a combination of connections from different tiers.

For example, a background computing process can be instantiated that (either local or with a central system) monitors for statistical dependence (e.g., tracking historical variations), or is configured to flag types of connections that might be expected to be dependent (e.g. two modems from the same carrier, or from different carriers (e.g., Telus and Bell) who might be using the same tower and link from tower to internet even if they run on different frequencies, or otherwise don't interact.

Connections similarly, for example, can be assessed using header information, base station information, connection identifiers, among others. There may be non-traditional connections available to be provisioned, for example, on an as-needed basis or priority basis that are available to certain types of users (e.g., defense and first responder customers having dedicated channels or the ability to request priority access).

In another embodiment, where correlations or interdependence is known but unavoidable (e.g., there are only a few connections available, so correlation or interdependence between active connections is likely to occur), the approach can include enforcing a discount factor to the reliability of a connection, or in another embodiment, simply treating the reliability "tier" of the connection to be a lower tier. For example, if Connection A (Tier 3) is being using for routing in combination with Connection B (Tier 3), and there is a correlation of interdependence between them, one of Connections A or B can be logically shifted during routing to be treated as a Tier 4. Accordingly, the packet may be sent 4 times instead of 3 times (e.g., two times on Connection A, and two times on Connection B).

The tiers are stored in tiered representation on a data storage. The representation can include the usage of data fields and data values that couple tiers and membership in groups thereof to specific identifiers of each of the connections. In operation of the system, the data values can be referenced to control specific operation of the system, such as data packet routing decisions, among others. The tier representations can be periodically or dynamically updated over time as the reliability of different connections changes or more information is obtained. In some embodiments, the plurality of connections are also assigned state representation values that are utilized in a state machine for transitioning different "states" assigned to the connections to automatically promote or demote them from states such as reliable, unreliable, indeterminate, etc. Other intermediate states are possible. These states can be transitioned through the use of automatic triggering conditions, and can logically be represented through the use of linked list items or other types of data objects that are adapted for automatic state transitions. The state representations and the tiered representations can both be utilized as part of a logical control flow in selecting communications interfaces to use for communicating data packets.

As described in various embodiments herein, an important consideration is the target probability threshold. Another countervailing consideration is the importance of practical limitations around bandwidth efficiency (e.g., ensuring a sufficient proportion of "goodput" in the communications). The mechanisms described herein can be used to automatically balance these considerations and provide a technically useful mechanism for improving the overall reliability of data packet transmissions in view of limited network resources.

Furthermore, the approaches described herein are especially useful where the reliability of connections is inconsistent (e.g., satellite connections whose connection quality varies from cloud cover, or heavily congested networks that have unpredictable usage patterns). An agglomeration of unreliable connections may be used together to achieve the target probability of transmission through re-transmissions. The tiering of connections into different tiered representations and groups, and maintaining an adaptive data structure tracking changes over time is useful for maintaining a computational ease and reducing overall computational overhead required to determine the reliability of individual connections.

The routing system utilizing the tiered connections can update the tiers, for example, as the routing system moves through through a geospatial area (e.g., where the routing system is mounted in a vehicle or is being carried by a person), or as conditions change for a communications station that is in a static location but subject to heavy variability in connection quality (e.g., rural communications stations in developing countries where infrastructure is still being established, or where connectivity is provided by a constellation of orbital devices whose reliability shifts over time as the orbital devices transit through defined paths overhead). The usage of unreliable connections becomes feasible, albeit at the cost of transmission efficiency as packets are re-transmitted repeatedly based on the automatic probabilistic modelling of the routing system through the tiered representations for routing control.

An elegant mechanism for reducing the potential for "goodput" proportion threshold violations is to establish a ceiling for a number of transmissions. Where the tiering number corresponds to a number of transmissions, this means that the "goodput" proportion threshold can be converted into a maximum tier after which the connection is simply not used. As the "goodput" proportion threshold can be adjusted (e.g., on a user interface or where a target transmission probability cannot be achieved), the number of tiers that are available for use can change, modifying a technical trade-off between reliability and bandwidth usage efficiency. In some embodiments, the "goodput" proportion threshold is manually adjusted (e.g., on a slider by a network administrator), and in other embodiments, "goodput" proportion threshold is automatically adjusted by the system based on a set of stored logical rules. A different threshold can be applied for different types of communications—e.g., communications marked as high criticality may be sent despite a very low goodput proportion, and vice versa.

To achieve a target transmission probability of success, connections across different tiers can be mixed such that there can be transmissions in tier 2 and tier 3, for example. Grouping the connections ahead of time in the tiers is useful in that connections are readily mixed to roughly achieve a desired probability without too much computation at the time of routing decision making (e.g., each computation required reduces performance of the system).

The tiered representation can also include un-assigned connections which are awaiting tier assignment, and in some embodiments, all of these connections are coupled with a state representation, such as undetermined, or, in another embodiment, all of these connections are denoted as unreliable. In some embodiments, data packets or test packets are periodically transmitted through the un-assigned connections to automatically probe characteristics of the connections to determine whether they can be promoted into a useable tier or if a state transition can occur.

The usage of the un-assigned connections can, for example, be used in overflow situations where there are not enough connections in the tiers to achieve a target threshold without a "goodput" violation, or in periodically in normal usage even without an overflow condition to probe the un-assigned connections. The un-assigned connections can be assigned a seeded reliability probability that can be updated over time as transmission characteristic observations are obtained. Un-assigned connections can each be associated with a timer configured such that every time the un-assigned connection is probed, the timer is reset and the connection cannot be re-tested again until a period of time has elapsed.

Specific embodiments will have different approaches for each of 001-004 and will subsequently be described in more detail.

Figure 1B:
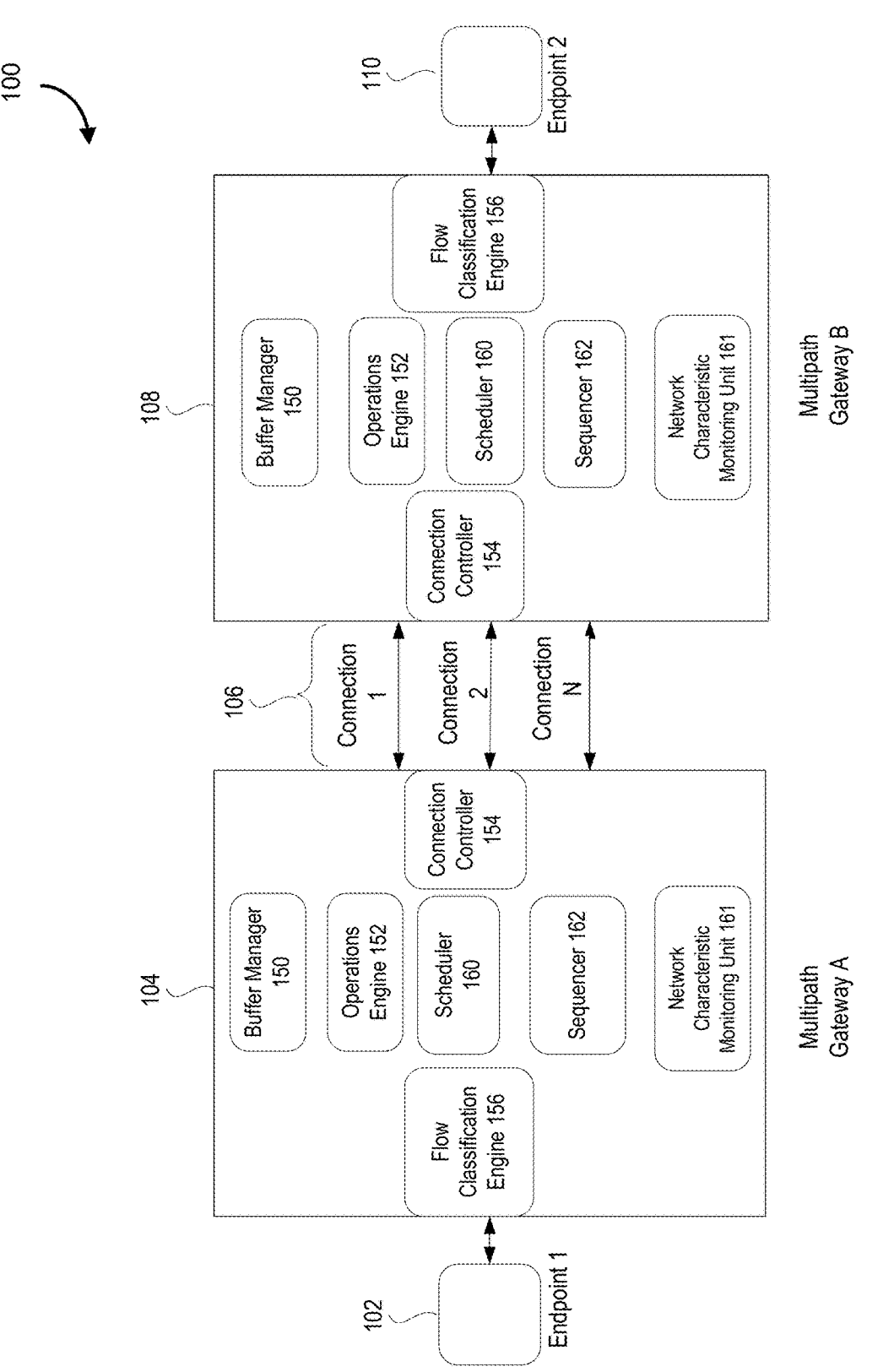
FIG. 1B is an example block schematic for a communications gateway device, according to some embodiments.

FIG. 1B illustrates a blended connection aggregation system 100 that is configured to utilize an improved scheduling approach on the transmitting portion of the system and a buffering system on the receiving end with sequencing of packets. The components in the system as illustrated, in an embodiment, are hardware components that are configured for interoperation with one another. In another embodiment, the hardware components are not discrete components and more than one of the components can be implemented on a particular hardware component (e.g., a computer chip that performs the function of two or more of the components).

In some embodiments, the hardware components reside on the same platform (e.g., the same printed circuit board), and the system 100 is a singular device that can be transported, connected to a data center/field carry-able device (e.g., a rugged mobile transmitter), etc. In another embodiment, the components are decentralized and may not all be positioned in close proximity, but rather, communicate electronically through telecommunications (e.g., processing and control, rather than being performed locally, are conducted by components residing in a distributed resources environment (e.g., cloud)).

Providing blended connectivity is particularly desirable in mobile scenarios where signal quality, availability of networks, quality networks, etc. are sub-optimal (e.g., professional newsgathering/video creation may take place in locations without strong network infrastructure). Accordingly, in some embodiments, the device described herein is a ruggedized network controller device that is adapted for operation in remote or mobile scenarios, which, for example, can be man-portable (e.g., worn by a journalist technologist in a backpack), cart-portable (e.g., pushed along on a media cart), or vehicle-portable (e.g., coupled to a media van, truck, boat, helicopter, or airplane).

Alternatively, the device can located in a communication hub or other type of centralized communication facility that coordinates connections to further endpoints. For example, in this example, the device can be located, coupled to, or residing in a communications installation, such as a communications relay site (e.g., satellite station, relay transmitter, broadcast translator, re-broadcaster, repeater, complementary station), which can coordinate communications across a number of different channels to various endpoints, which can be television stations, radio stations, data communication stations, personal computers, mobile devices, among others.

A number of different data connections 106 (e.g., "paths") representing one or more networks (or network channels) are shown, labelled as Connection 1, Connection 2 . . . Connection N. There may be multiple data connections/paths across a single network, or multiple data connections that may use one or more networks.

These data connections can include various types of technologies, and each can face different communication circumstances, such as having different types of available communication power, array architectures, polarizations, multipath propagation mechanisms, spectral interference, frequency ranges, modulation, among others, and accordingly, the connections may all have different levels of communications reliability.

The system 100 may be configured to communicate to various endpoints 102, 110 or applications, which do not need to have any information about the multiple paths/connections 106 used to request and receive data (e.g., the endpoints 102, 110 can function independently of the paths or connections 106). The received data, for example, can be re-constructed such that the original transmission can be regenerated from the contributions of the different paths/ connections 106 (an example use scenario would be the regeneration of video by way of a receiver that is configured to slot into a server rack at a data center facility, integrating with existing broadcast infrastructure to provide improved networking capabilities).

The system 100 receives input (data flows) from a source endpoint 102 and schedules improved delivery of data packets across various connections 106, and then sequences the data packets at the other end of the system 108 prior to transmission to the destination endpoint application 110. In doing so, the system 100 is configured to increase bandwidth to approach the sum of the maximum bandwidth of the various paths available. Compared to using a single connection, the system 100 also provides improved reliability, which can be an important consideration in time-limited, highly sensitive scenarios, such as newsgathering at live events as the events are taking place. At these events, there may be high signal congestion (e.g., sporting event), or unreliability across one or more of the paths (e.g., reporting news after a natural disaster).

Multiple connections can be bonded together to operate as a single connection, and different approaches can be utilized to coordinate routing such that a connection can be used multiple times to send a same packet, among others.

In various embodiments, both the scheduler 160 and the sequencer 162 could be provided from a cloud computing implementation, or at an endpoint (prior to the data being consumed by the application at the endpoint), or in various combinations thereof.

The system 100 may be tuned to optimize and or prioritize performance, best latency, best throughput, least jitter (variation in the latency on a packet flow between two systems), cost of connection, combinations of connections for particular flows, among others (e.g., if the system 100 has information that a transmission (data flow) is of content type X, the system 100 may be configured to only use data connections with similar latency, whereas content type Y may allow a broader mix of data connections (or require greater net capacity which can only be accomplished with a combination of data connections)).

The tuning described above may be provided to the system generally, or specific to each flow (or set of flows based on location, owner of either starting point or endpoint or combination thereof, time of transmission, set of communication links available, security needed for transmission etc.).

The system 100 may be generally bidirectional, in that each gateway 104, 108, will generally have a scheduler 160 and sequencer 162 to handle the TCP traffic (or UDP traffic, or a combination of TCP and UDP traffic, or any type of general internet protocol (IP) traffic), though in some embodiments, only one gateway may be required.

The system 100 may be utilized for various scenarios, for example, as a failover (e.g., for disaster recovery) or supplement for an existing Internet connection (e.g., a VoIP phone system, or corporate connection to web), whereby additional networks (or paths) are seamlessly added to either replace a dropped primary Internet connection, or supplement a saturated primary Internet connection by bonding it with costlier networks. In a failover situation, there could be a coordinated failure across many communication channels (e.g., a massive denial of service attack or a major solar storm/ geomagnetic storm), and the system 100 would then require an efficient use of communication resources as available communication resources are at a premium.

Another use of the system 100 is to provide a means of maximizing the usage of a high cost (often sunk cost), high reliability data connections such as satellite, by allowing for the offloading of traffic onto other data connections with different attributes.

In some embodiments, the system 100 is a network gateway configured for routing data flows across a plurality of network connections.

FIG. 1B provides an overview of a system with two gateways 104 and 108, each containing a buffer manager 150, an operations engine 152, a connection controller 154, a flow classification engine 156 (responsible for flow identification and classification), a scheduler 160, a sequencer 162, and a network characteristic monitoring unit 161 and linked by N data connections 106, with each gateway connected to a particular endpoint 102, 110. The reference letters A and B are used to distinguish between components of each of the two gateways 104 and 108.

Each gateway 104 and 108 is configured to include a plurality of network interfaces for transmitting data over the plurality of network connections and is a device (e.g., including configured hardware, software, or embedded firmware), including processors configured for: monitoring time-variant network transmission characteristics of the plurality of network connections; parsing at least one packet of a data flow of packets to identify a data flow class for the data flow, wherein the data flow class defines or is otherwise associated with at least one network interface requirement for the data flow; and routing packets in the data flow across the plurality of network connections based on the data flow class, and the time-variant network transmission characteristics.

The buffer manager 150 is configured to set buffers within the gateway that are adapted to more efficiently manage traffic (both individual flows and the combination of multiple simultaneous flows going through the system). In some embodiments, the buffer manager 150 is a discrete processor. In other embodiments, the buffer manager 150 is a computing unit provided by way of a processor that is configured to perform buffer management 150 among other activities.

The operations engine 152 is configured to apply one or more deterministic methods and/or logical operations based on received input data sets (e.g., feedback information, network congestion information, transmission characteristics) to inform the system about constraints that are to be applied to the blended connection, either per user/client, destination/server, connection (e.g., latency, throughput, cost, jitter, reliability), flow type/requirements (e.g., FTP vs. HTTP vs. streaming video).

For instance, the operations engine 152 may be configured to limit certain types of flows to a particular connection or set of data connections based on cost in one instance, but for a different user or flow type, reliability and low latency may be more important. Different conditions, triggers, methods may be utilized depending, for example, on one or more elements of known information.

The operations engine 152, for example, may be provided on a same or different processor than buffer manager 150.

The operations engine 152 may be configured to generate, apply, or otherwise manipulate or use one or more rule sets determining logical operations through which routing over the N data connections 106 is controlled.

The flow classification engine 156 is configured to evaluate each data flow received by the multipath gateway 104 for transmission, and is configured to apply a flow classification approach to determine the type of traffic being sent and its requirements, if not already known. In some embodiments, deep packet inspection techniques are adapted to perform the determination. In another embodiment, the evaluation is based on heuristic methods or data flows that have been marked or labelled when generated. In another embodiment, the evaluation is based on rules provided by the user/administrator of the system. In another embodiment, a combination of methods is used.

The flow classification engine 156 is configured to interoperate with one or more network interfaces, and may be implemented using electronic circuits or processors.

The scheduler 160 is configured to perform a determination regarding which packets (and the amount of redundancy that) should be sent down which connections 106. The scheduler 160 may be considered as an improved Quality of Service (QoS) engine. The scheduler 160 may include a series of logical gates confirmed for performing the determinations.

The scheduler 160, in some embodiments, is implemented using one or more processors, or a standalone chip or configured circuit, such as a comparator circuit or an FPGA.

While a typical QoS engine manages a single connection—a QoS engine (or in this case, the scheduler 160) may be configured to perform flow identification and classification, and the end result is that the QoS engine reorders packets before they are sent out on the one connection.

In contrast, while the scheduler 160 is configured to perform flow identification, classification, and packet reordering, the scheduler 160 of some embodiments is further configured to perform a determination as to which connection to send the packet on in order to give the data flow improved transmission characteristics, and/or meet policies set for the flow by the user/administrator (or set out in various rules). The scheduler 160 may, for example, modify network interface operating characteristics by transmitting sets of control signals to the network interfaces to switch them on or off, or to indicate which should be used to route data. The control signals may be instruction sets indicative of specific characteristics of the desired routing, such as packet timing, reservations of the network interface for particular types of traffic, etc.

For example, 2 connections with the following characteristics are considered:

Connection 1: 1 ms round trip time (RTT), 0.5 Mbps estimated bandwidth; and

Connection 2: 30 ms RTT, 10 Mbps estimated bandwidth.

The scheduler 160 could try to reserve Connection 1 exclusively for Domain Name System (DNS) traffic (small packets, low latency). In this example, there may be so much DNS traffic that Connection 1's capacity is reached—the scheduler 160 could be configured to overflow the traffic to Connection 2, but the scheduler 160 could do so selectively based on other determinations or factors (e.g., if scheduler 160 is configured to provide a fair determination, the scheduler 160 could be configured to first overflow traffic from IP addresses that have already sent a significant amount of DNS traffic in the past X seconds).

The scheduler 160 may be configured to process the determinations based, for example, on processes or methods that operate in conjunction with one or more processors or a similar implementation in hardware (e.g., an FPGA).

The scheduler 160 may be configured for operation under control of the operations engine 152, disassembling data streams into data packets and then routing the data packets into buffers (managed by the buffer manager 150) that feed data packets to the data connections according to rules that seek to optimize packet delivery while taking into account the characteristics of the data connections.

The scheduler 160, in an embodiment, is a data communications scheduler that receives as a parameter the tier number when deciding how many times a packet (or portion thereof) should be transmitted, and on which connection(s). The scheduler 160 is adapted to control the forwarding of data packets, for example, by appending header information or controlling transmission across a routing table or a routing policy stored in a reference data structure on computer memory or data storage.

The routing table or routing policy can be periodically or continuously updated as described in various embodiments here. The routing table or routing policy can be stored, in some embodiments as computer interpretable instructions residing on non-transitory computer readable media (e.g., as an article of manufacture). Updates include adaptations in respect of using connections of dubious reliability for repeated transmissions of data packets to achieve a minimum probability of data loss. The routing table can be a data table of the scheduler 160 or the router that lists routes to particular network destinations, and can include various metrics and may be based on the sensed topology of the various network connections.

As described herein, discovery approaches can also be used to adapt to new interfaces having unknown reliability or known interfaces having changed reliability (e.g., from reliable to unreliable, or vice versa). The routing table, for instance, can include network/next hop associations stored as data structures or linked data elements to control the relaying of packets to destinations.

The routing table can be used for generating forwarding tables, which can provide a compressed or pre-compiled approach for optimizing hardware storage and backup, separating control and forwarding in some instances. Routing/forwarding tables can include intermediate network destination addresses (e.g., IPv4, IPv6), netmasks, gateways, interface addresses, and metrics, among others.

Blended connectivity systems can utilize advanced approaches for handling unreliable connections 106, since they are able to use the strengths and weaknesses of the connections available to them in a way that provides more reliable connectivity overall. For example, as described in U.S. application Ser. No. 14/360372 (granted as U.S. Pat. No. 9,357,427) entitled "DEVICE AND METHOD FOR CHARACTERIZATION AND OPTIMIZATION OF MULTIPLE SIMULTANEOUS REAL-TIME DATA CONNECTIONS", and incorporated herein by reference in its entirety, if a high latency, high throughput satellite connection is paired with a low latency, low throughput terrestrial connection, the terrestrial connection can be used to service ARQ for the satellite connection with little impact on the overall latency and reliability of the system.

Other blended systems might use heuristics or techniques such as machine learning to predict when a connection will become unreliable, and then stop using the connection just before that transition occurs.

Figure 1C:
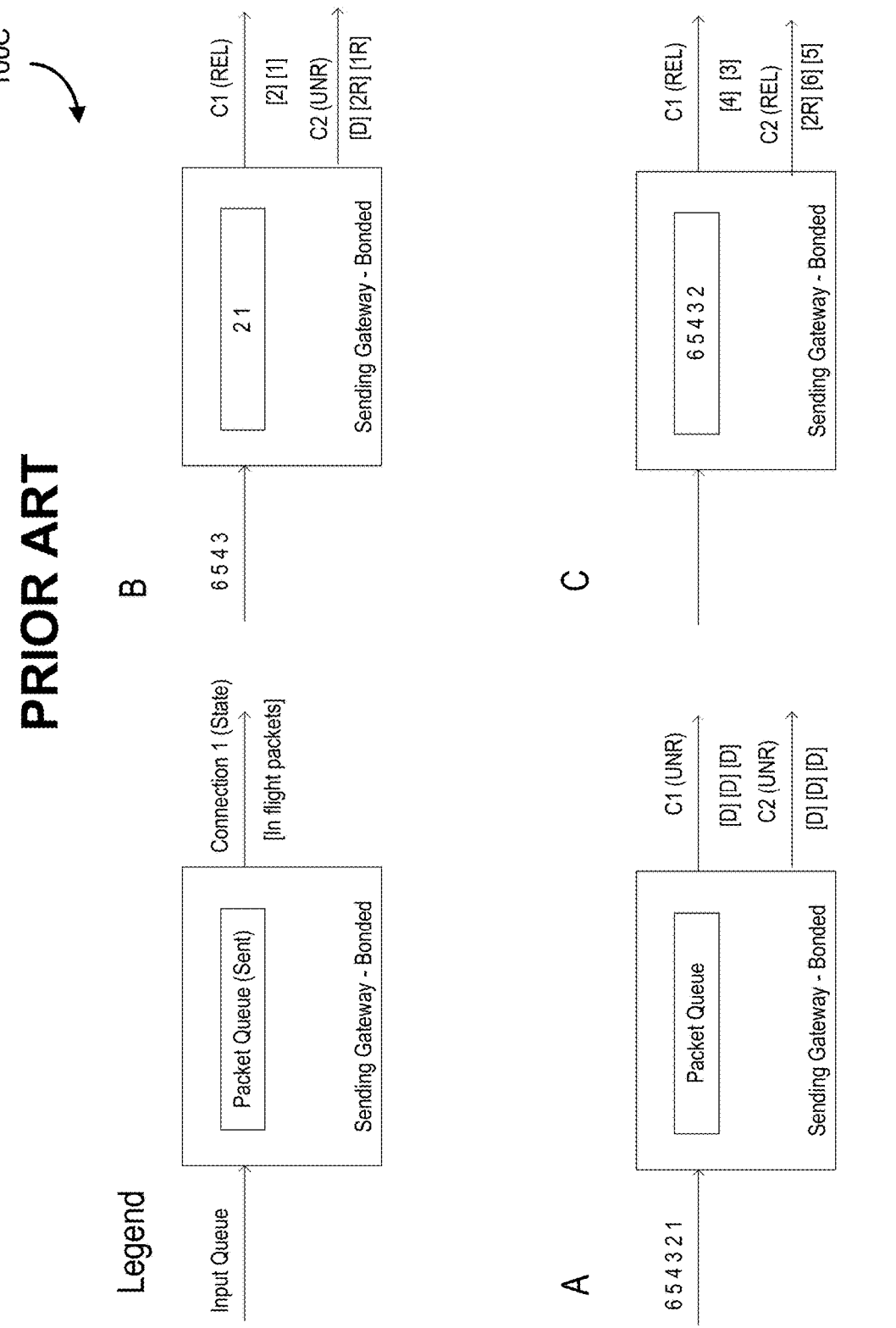
FIG. 1C is a schematic diagram of an example system describing an alternate approach that is less efficient than some approaches described herein in various embodiments.

FIG. 1C is a schematic diagram 100C of one such blended system describing an approach that is less efficient than the approaches that will be subsequently described herein in various embodiments. This approach is shown as an example to illustrate some of the technical challenges that lead to less efficient data transmissions and/or communications.

In FIG. 1C, connections that are below the target reliability threshold are not used to transmit new data. They stay in an unreliable (UNR) state and are only used to send either duplicates of packets that were already sent on reliable (REL) connections, or empty "dummy" [D] packets.

FIG. 1C(A) shows an initial state, where 6 packets are available for transmission, but both connections C1 and C2 are currently in the UNR state. As a result, they are only able to transmit empty "dummy" [D] packets, and the 6 packets at the input queue remain un-serviced. This is the primary drawback of this embodiment. Even though C1 and C2 are UNR, they are likely not dropping 100% of all transmitted packets, yet the data remains un-serviced in the input queue. Some of the dummy [D] packets are arriving, and they could serve a more useful purpose if they contained any of the 6 packets at the input queue instead.

FIG. 1C(B) shows the next state, where connection C1 has transitioned to the REL state, so it is now able to service the input queue. It transmits packets [1] and [2], placing them inflight toward the receiver. Connection C2 remains in an UNR state and is only able to transmit duplicates of packets 1 and 2 ([1R] and [2R] respectively), or the empty "dummy" [D] packets.

FIG. 1C(C) shows the next state, where connection C2 has also transitioned to the REL state. Connection C1 transmits packets [3] and [4], and Connection C2 transmits packets [5] and [6]. Also, in this example packet [2] that was previously transmitted on C1 was lost, and C2 happens to service the ARQ request by sending yet another duplicate of packet 2 [2R]. This is another technical drawback of this embodiment—the traditional ARQ request to handle packet 2 results in packet 2 arriving at the receiver with high latency since it required an extra round-trip.

Figure 2:
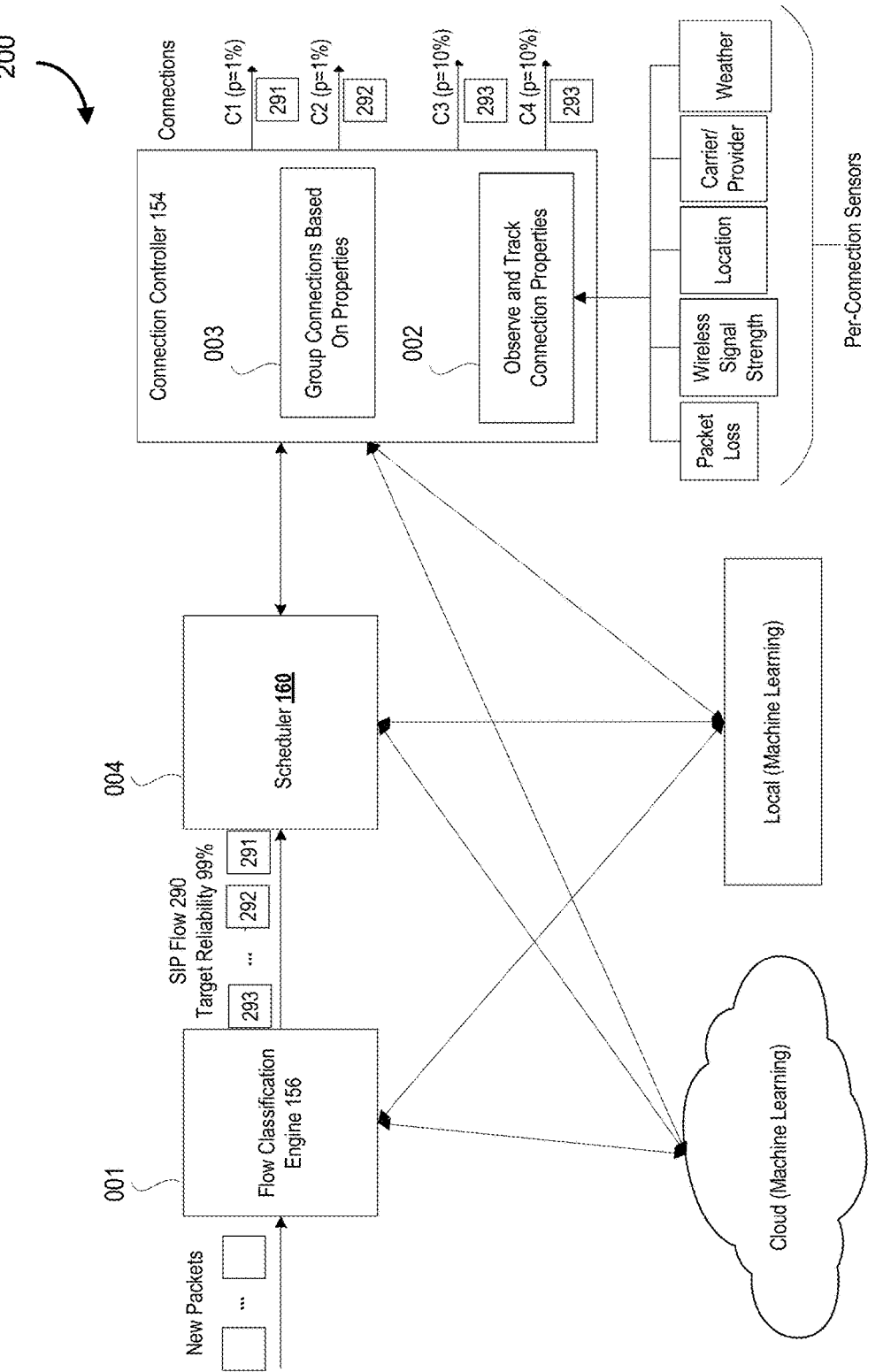
FIG. 2 is a system level diagram showing an example embodiment of the scheduler mechanism interoperating with other controller components and a flow classification engine, according to some embodiments.

An improved approach for handling unreliable connections in blended connectivity systems described herein is termed PFLC and consists of the four components 001, 002, 003, and 004 that are further exemplified in FIG. 2. FIG. 2 is a diagram 200 that provides an illustration of the scheduler 160 interoperating with other components to control communications and/or routing of data packets.

The flow identifier 001 identifies the flow of reliability requirements. Flow classification engine 156 groups and tracks the packets arriving at the input into logical flows, based on techniques such as the IP 5-tuple (e.g., source IP address/port, destination IP address/port, protocol). Other techniques are possible. Each of these flows contains the data pertaining to a specific application or conversation (for example, a bi-directional VoIP session between two endpoints 102 or 110).

The flow identifier 001 also determines the reliability requirements for these flows. In some embodiments this might be accomplished by utilizing techniques such as deep packet inspection (DPI), codified rules and heuristics, machine learning, or user configured hints.

For example, in FIG. 2, the packets comprising flow 290 match a user configured rule for Session Initiation Protocol (SIP) VoIP traffic on UDP port 5061, requesting 99% reliability.

The connection manager 002 is configured for measurement and observation of connection properties. Connection controller 154 is configured to track historical, current, and predicted future reliabilities on a per-connection basis. For example, for some embodiments this might include measurement of packet/byte loss, monitoring of external metrics such as wireless signal strength, taking into account user/administrator hints, or machine learning techniques.

The information could be "crowdsourced", either based on set of rules, machine learning, etc. (with nearby, or "friendly" (e.g., corporate owned) devices) or obtained through other methods. Crowdsourced data can be provided in the form of input data sets representing monitored information, which is then utilized by the system 200 to modify how routing is conducted for communications.

The system 200 may collect statistical information (cost, loss, latency, etc.) per a combination of the following (but not limited to):
1. Exact location (such as GPS coordinates)
2. Technology (2G, 3G, 4G, satellite, . . . )
3. Exact time and date
4. Weather if possible
5. Carrier/provider
6. Physical device (satellite dish size, cellular antenna form factor, etc.)
7. Others Optimization approaches can be applied (e.g., machine learning approaches) to predict what the performance of the data communications will be. Reporting and accessing this information can be done in various ways, including peer-to-peer, or through a central server which manages and weights various sources of information (e.g., weighted by reliability, correlations). For example, if there is geographic specific fade—geo location—historical data may indicate a need to shift processes, for example, based on location and carrier. Processing of these statistics for decision making can be either done on the device, on a server and pushed down, or a combination of the device and server.

In some embodiments, connection controller 154 will summarize its observations and predictions into a single per-connection scalar value, p, the probability of independent, uniformly distributed loss. For example, in FIG. 2, connections C1 and C2 are summarized from observations as each having a p value of 1%. Connection C3 and C4 are each summarized with a p value of 10%.

Some embodiments of connection controller 154 may also expose other summarized and non-summarized observations of the underlying connections, since loss that is not independent or uniformly distributed may be difficult to summarize into a single scalar value. For example, some embodiments may include background processes (either local or with a central system) that analyze the observations for statistical dependence, or based on rules/heuristics, pay special attention to some types of connections that might be expected to be dependent (e.g., two modems belonging to the same wireless carrier, or from different carriers that are known to share infrastructure, or any other type of connections that have some kind of interdependence in behaviour due to sharing of an underlying resource).

The third component 003 is the grouping of connections with similar historical, current, or predicted future connection properties. In some embodiments, this grouping is done by connection controller 154, based on the summarized scalar value of p.

For example, in FIG. 2, connection controller 154 has placed connections C1 and C2 in one group, and connections C3 and C4 into a second group. Other embodiments could group based on other dimensions, using the summarized or non-summarized observations of other underlying connection properties. For example, groupings could be based on connection cost (higher cost ones grouped into a lower priority). Another example would be grouping the connections based on RTT, so that packets that have a deadline can be preferentially scheduled onto groups of connections most likely to satisfy the deadline.

The fourth component 004 is scheduling of packets onto the groups of connections in a manner that meets the flow reliability requirements while simultaneously taking into account other constraints such as cost, efficiency, and latency.

For example, in FIG. 2, scheduler 160 has scheduled packets comprising flow 290 in a way such that every packet meets the target reliability of 99%. Specifically, packets 291 and 292 were scheduled onto connections C1 and C2 (respectively), and each of the connections are able to meet the target reliability on their own. Packet 293 was duplicated, sent once on each of C3 and C4. In this example, the summarized values of p for each connection were known to be uncorrelated/independent loss events, therefore transmitting the packet twice resulted in a composite reliability of 99%: $(1-p_{C1} \times p_{C2})=(1-0.1 \times 0.1)=0.99$.

The following paragraphs provide more detailed descriptions of specific embodiments of the second component 002 of PFLC: measurement and observation of connection properties.

In some embodiments, the reliability of a particular connection is assessed by measuring the amount of loss incurred by this connection. The reliability of a particular connection is inversely proportional to the amount of loss it incurs.

In one embodiment, the amount of loss incurred by a particular connection is measured as the percentage of packets lost over this connection. The sender divides the packets it needs to transmit over a particular connection into groups.

Each group is assigned a unique identifier. The packets in a particular group are tagged with the unique identifier of the group. The receiver records all the group unique identifiers it sees, and counts the number of received packets that are tagged with these unique identifiers. Duplicate packets are discarded to avoid double-counting. The receiver reports the counts periodically back to the sender. The sender can now determine the percentage of lost packets by calculating the difference between the number of packets sent and the number of packets received and dividing this difference by the number of packets sent. Each group unique identifier yields one loss percentage value.

In another embodiment, the number of bytes is used instead of the number of packets to calculate the loss percentage value.

In yet another embodiment, both the number of packets and the number bytes are used. This approach generates two loss percentage values per group unique identifier. The two values can be combined, for example, by averaging them, taking the minimum value, taking the maximum value, or by any other means, to yield one loss percentage value that is deemed representative of this connection.

A plurality of loss percentage values may be generated for each connection over time. In one embodiment, the most recently calculated loss percentage value for a particular connection is attributed to it. In another embodiment, the group unique identifiers used by a particular connection are always increasing and the loss percentage value from the highest group unique identifier is attributed to this connection.

The loss incurred by a particular connection may not be uniform or consistent over time. For example, a connection may drop one group of packets completely and then deliver the next group of packets completely. Each of these two groups of packets will give a significantly different view of the reliability of this connection within a relatively short period of time.

It may be possible to overcome this technical shortcoming by recording and processing the plurality of lost percentage values generated over time for a particular connection. The processing may reduce the plurality of loss percentage values to a single value, for example by averaging them, taking the maximum, taking the minimum, or by any other means. The single value is deemed representative of this connection.

A technical approach to account for this lack of uniformity is to utilize intensity-weighted measures (a bunch of samples clustered may be more (or less) representative than "isolated" (in time) samples), among others. The time weighted samples give snapshots of the types of loss experienced on the connection at various points in time, which, for example, can be observed as looking "bursty", uniform, etc. A historical memory of these snapshots can be tracked in data storage that could be used to weight or change the scalar 'p' value summarized for the connection.

Other approaches are possible, such as using time-weighted approaches to modify intervals, and in variant embodiments, a sampling engine can be utilized to generate and transmit probe sample data packets to establish baseline for measurements based on actual experience (e.g., some flaky links may be sampled randomly, more frequently, or with alternative types of packets/groups-of-packets, based on experience with that link.

In some embodiments, only groups of packets that saturate the connection they are sent on are used to generate loss percentage values. The reasoning behind this logic is that a particular connection may only portray its loss characteristics once it is fully utilized. In some embodiments, a connection is saturated if it is not application limited, as defined by the IETF ICCRG draft, "draft-cheng-iccrg-delivery-rate-estimation-00", incorporated here by reference in its entirety.

In one embodiment, the plurality of loss percentage values for a particular connection are recorded for a fixed interval of time. When the age of a recorded value exceeds the fixed interval of time, this value is discarded.

In another embodiment, the plurality of loss percentage values for a particular connection are recorded up to a maximum number of values. When the maximum is reached, a new value displaces the oldest value.

When the plurality of loss percentage values recorded over a period of time are reduced to a single value, different connections with different loss patterns may appear to have similar loss properties. For example, assume that an application sends 10 packets every second for ten seconds; a total of 100 packets are sent. Consider a connection, C1, with a relatively uniform loss pattern that loses 1 packet every 1 second. C1 will lose 10 of the 100 packets over the period of 10 seconds. Consider another connection, C2, with a relatively bursty loss pattern that loses 10 packets in one shot every 10 seconds. C2 will also lose 10 of the 100 packets over the period of 10 seconds. Both C1 and C2 yield a loss percentage value of 10% in a 10-second fixed interval, however, their loss patterns are very different. The sender may benefit from using different transmission strategies for each of these connections.

According to some embodiments, it is possible to infer more information about the loss pattern of a particular connection by recording a plurality of loss percentage values over several time intervals. A shorter interval gives a more instantaneous view of the loss properties of the connection. A longer interval gives a more general view of the loss properties of a connection.

According to some embodiments, the number of time intervals is fixed. In one embodiment, three time intervals are used: short, medium, and long. If similar loss percentage values are calculated (e.g., determined, observed) over all three intervals, the loss pattern can be considered relatively uniform. In such a scenario, the sender, for example, may choose to compute and transmit FEC to allow recovery of the lost packets at the receiver, or simply duplicate enough packets to reduce the chances of the receiver detecting lost packets.

If the loss percentage value calculated over the short interval is significantly larger than the loss percentage value calculated (e.g., determined, observed) over the long interval, the loss pattern can be considered relatively bursty. In such a scenario, the sender, for example, may choose to temporarily stop transmitting packets to avoid significant loss, until the bursty loss interval has passed.

Further inferences can be made and strategies can be developed based on comparing the loss percentage values calculated from various time intervals. The scenarios discussed here are only exemplary and in no way limiting, and other variations are possible. For example, according to some embodiments, the inferred information about the pattern/distribution of loss on a connection (uniform versus bursty, for example) that is obtained from analyzing the loss over the varying time intervals is kept in a historical record and is another dimension over which packet scheduling decisions can be made by component 004 of PFLC.

A distinction arises between connections C1 and C2 by applying the concept of a plurality of intervals with different lengths to the previous example. Assume that the loss of each of C1 and C2 is being recorded in two time intervals. The first time interval is relatively short and has a length of 1 second. The second time interval is relatively long and has a length of 10 seconds. For C1, both the short and long interval will always yield a loss percentage value of 10%. For C2, assume that the 10 packets dropped in one shot happen on the fifth transmission event. The short interval will yield a loss percentage value of 100%, while the long interval will yield a loss percentage value of 20%. This difference between the short time interval and the long time interval indicates that the loss properties of C2 are less uniform and more bursty.

According to other embodiments, the number of time intervals is variable and can be adjusted as more information is gathered about a particular connection. For example, if a connection is determined to be of a certain type that only exhibits uniform loss, then the number of intervals can be reduced to one, which should be enough to measure the uniform loss.

According to some embodiments, the lengths of the time intervals are fixed.

According to other embodiments, the lengths of the time intervals are variable and can be adjusted based on the information that is known, configured, needs to be gathered or was gathered about a particular connection.

In one embodiment, statistical analysis can be used to determine how fast a connection is changing properties by determining how older loss percentage values are correlated to newer loss percentage values and by choosing a cut-off age (i.e., interval length), such that loss samples older than that age are discarded; otherwise, outdated samples can be detrimental to system performance.

In another embodiment, if the length of a loss event is to be measured, the length of the time interval can be increased if the loss event length may exceed it.

In another embodiment, if the system is adapted to use a connection for real-time traffic, the system may shorten the time intervals so it can react faster/more aggressively.

In another embodiment, data flows may be identified to have deadlines and those deadlines may dictate the length of the time intervals used to measure loss (e.g., there is no point in using long time intervals for near-term deadlines).

According to some embodiments, updating the values in each of the time intervals is triggered by one or more events.

One trigger is purely the passage of time. For example, every time a new group of packets is to be transmitted, the system could discard samples that have expired from each of the time intervals, determine the new drop probabilities, any other state information belonging to component 004 (e.g. tiers and connections states), and then decide how to transmit this new group of packets.

Another trigger could be receiving new information from the peer about loss, so the system adds this new sample to the windows and recalculates as above.

Examples of other triggers could include events such as a connection losing or regaining physical link state (cable unplugged/replugged), explicit congestion notification (ECN) from the network, change in physical location, change in wireless bands/frequencies, etc.

Some embodiments may weight or prioritize these triggers, choosing to ignore some triggers when there is conflicting information.

Updating the loss data (which determines everything else) depends naturally on sending data and getting feedback about it, and in some embodiments, a feedback mechanism is established for sending of monitored connection data, including latency, throughput, and connection pathways (e.g., routes taken), among others.

In one embodiment, CPU and memory resource consumption can be reduced by trading off some accuracy of the measured loss percentage value. Each loss percentage value can be expressed as two values, the number of lost packets and the number of total packets. The time intervals can be divided into smaller subintervals. Loss percentage values can then be accumulated (by summing their lost packet counts and summing their total packet counts) and related to their specific subintervals. This eliminates the need to store each loss percentage value individually and a timestamp of when it was calculated. Accuracy is reduced because only the timestamp of a subinterval is recorded. When a subinterval expires, some of its accumulated sample could have expired earlier or could have not expired yet.

To generate a single loss percentage value that is representative of the loss properties of a connection over a particular time interval, sufficient numbers of loss percentage values may be required to be recorded over that time interval. In one embodiment, the recorded loss percentage values are deemed representative of the time interval if they span a time period that is half or more of that time interval.

Different decisions about the transmission strategy can be made based on whether a single representative loss percentage value of a particular time interval is available or not. In some embodiments, this is an aspect of component 004 of PFLC, where the validity of samples in the configured time intervals is summarized in the form of a per-connection state, which then influences the scheduler 160 transmission decisions. For example, a connection having many time intervals with insufficient samples might result in its state being deemed INDETERMINATE, causing scheduler 160 to only use the connection to transmit redundancy until the time intervals are filled with sufficient samples.

FIG. 3 is a diagram 300 showing an embodiment using several time intervals, dividing them into subintervals, and ensuring the generated loss percentage value per interval is considered representative of the interval (i.e., valid) only when the recorded samples span half or more of the particular interval, according to some embodiments. The number of time intervals is fixed at 3, and the lengths of these intervals are fixed at 0.5 seconds, 3 seconds and 30 seconds.

The 0.5-second time interval has 2 subintervals, each 0.25 seconds long, and is considered valid when at least 1 subinterval has samples in it. The 3-second time interval has 6 subintervals, each 0.5 seconds long, and is considered valid when at least 3 subintervals have samples in them. The 30-second time interval has 10 subintervals, each 3 seconds long, and is considered valid when at least 5 subintervals have samples in them. The same time intervals are used for all connections. The number and lengths of the intervals are considered suitable for a wide variety of common connections, such as cellular connections and wired connections.

In other embodiments, the probability of loss for a particular connection can be assessed by measuring other properties of the connection. For example, a substantial increase in the RTT of a connection, or a substantial decrease in the signal strength of a wireless connection, can indicate that the probability of loss occurring has increased.

According to some embodiments, measurements of connection properties that are not packet loss or byte loss can be converted by a custom mapping into loss percentage values. The resulting loss percentage values can then be recorded and utilized in a similar manner as actual loss percentage values.

In one embodiment, the RTT of a group of packets is measured as the time between transmitting this group of packets on a particular connection and receiving an acknowledgement from the receiver about how many packets were delivered. If the measured RTT for this group of packets exceeds a certain threshold, the loss percentage value is recorded as 100%. If the measured RTT for this group of packets does not exceed the threshold, the loss percentage value is recorded as the actual percentage of packets in this group that were delivered to the receiving side. If the acknowledgement is never received (either because all the packets were lost or the acknowledgement itself was lost) after a certain wait time, the loss percentage value is recorded as 100%. This achieves a mapping from RTT to loss percentage values.

In some embodiments, the maximum threshold for RTT is configured on a per-flow basis, as a function of each flow's latency requirements. For example, it is intuitive that a VoIP flow that requires <300 ms RTT should treat a connection with ≥300 ms RTT as effectively 100% loss.

The reliability of a single connection can be quantified by inversely relating it to the probability of dropping data sent on that connection. In one embodiment, the probability of dropping data sent on a connection (i.e. the drop probability) is considered equal to the loss percentage value measured on that connection, and the reliability can be quantified as a percentage value equal to 1 minus the drop probability.

The next paragraphs provide detailed descriptions of specific embodiments of component 003 of PFLC: grouping of connections with similar historical, current, or predicted future reliabilities.

In some embodiments, the summarized per-connection drop probability p (calculated by component 002) is used in conjunction with the reliability target T (calculated by the component 001), using the relation: $1-p^n \geq T$.

For each connection, solving for n in this relationship, and mapping it to the next integer greater than or equal to n (called N), results in a value that represents the number of times a packet must be transmitted on the connection in order to probabilistically meet or exceed the reliability target T.

The number N is referred to as the connection's Tier, and connections are grouped together as a function of their Tier number.

In some embodiments, a constant value for the reliability target T is used for all flows, meaning each connection is only assigned to one Tier (varying only based on each connection's value for p), and as a result there is only one grouping of connections based on the one set of calculated N values.

In some embodiments, each flow has its own reliability target T (e.g. VoIP flow desiring =99%, vs temperature sensor desiring T=80%). This potentially results in each connection being assigned a different Tier N on a per-flow basis, meaning each flow potentially sees a different grouping of connections as a function of both p and T.

In some embodiments, a limit is placed on the value of N in order to prevent excess bandwidth consumption. Meaning for combinations of p and T that result in a value of N greater than a maximum limit M, group these connections into Tier M.

In some embodiments, Tier M is referred to as Tier 0, and is treated differently for the purposes of scheduling/transmitting packets. For example, the connections in this Tier may be deemed unreliable (too many transmits required to achieve T), so they are only used to duplicate packets already transmitted on other connections (best effort/preemptive ARQ).

Figure 4:
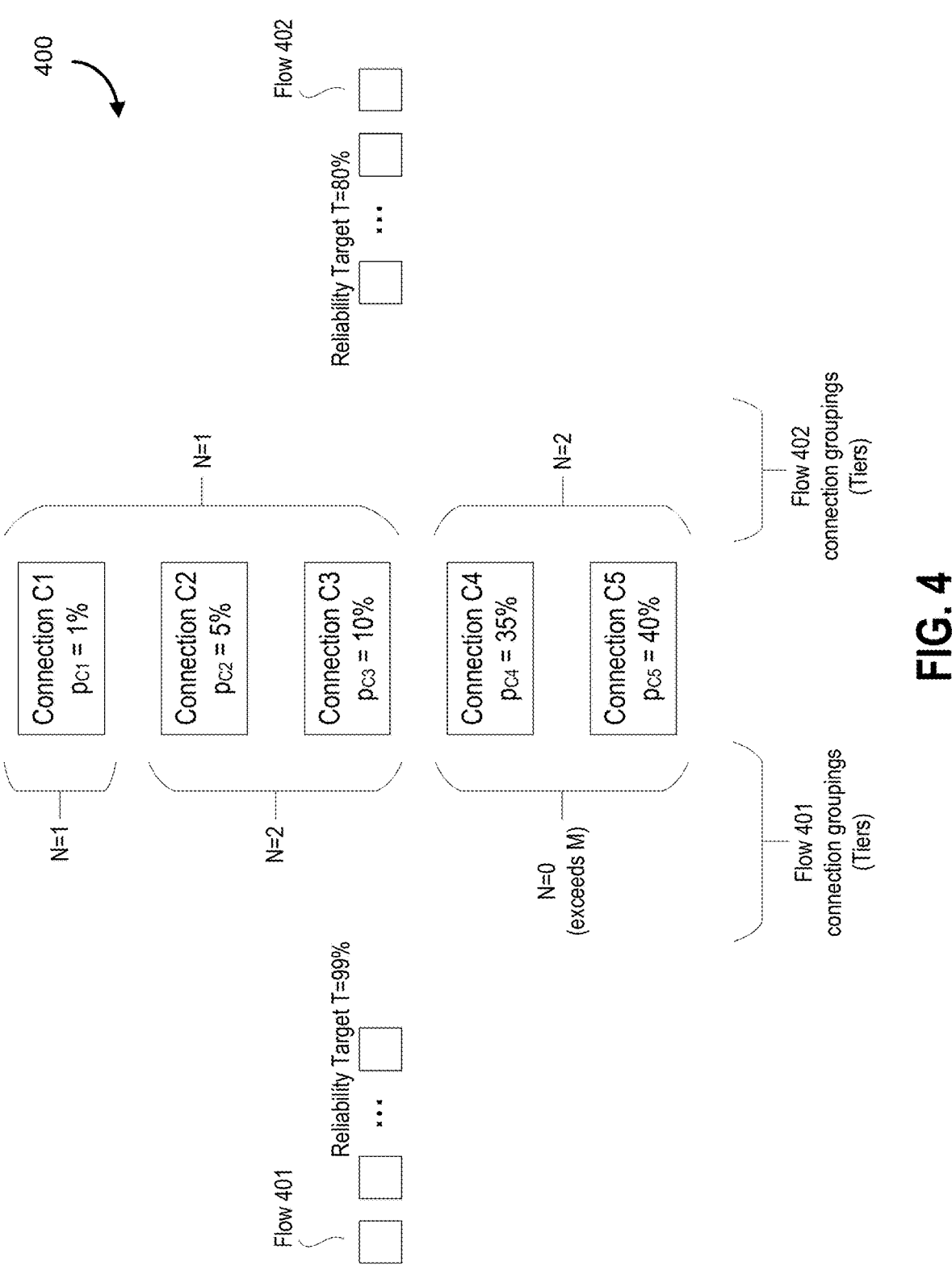
FIG. 4 is a flow diagram that exemplifies the grouping approach of some embodiments described herein.

FIG. 4 is a flow diagram 400 that exemplifies the grouping approach of some embodiments described herein.

Flow classification engine 156 has identified flow 401 as having a target reliability T=99% and flow 402 as having a target reliability T=80%.

Connection controller 154 has calculated a summarized p value (packet loss) for connections C1, C2, C3, C4, and C5 as (respectively): 1%, 5%, 10%, 35%, and 40%.

Scheduler 160 has been configured with a maximum tier limit M=3.

For flow 401 (T=99%), the calculated tier N for each connection is:

$$C1(p = 1\%): N = \text{CEIL}\left[\frac{\log(1 - 0.99)}{\log(0.01)}\right] = 1$$

$$C2(p = 5\%): N = \text{CEIL}\left[\frac{\log(1 - 0.99)}{\log(0.05)}\right] = 2$$

$$C3(p = 10\%): N = \text{CEIL}\left[\frac{\log(1 - 0.99)}{\log(0.10)}\right] = 2$$

$$C4(p = 35\%): N = \text{CEIL}\left[\frac{\log(1 - 0.99)}{\log(0.35)}\right] = 5 \ (\geq M \to N = 0)$$

$$C5(p = 40\%): N = \text{CEIL}\left[\frac{\log(1 - 0.99)}{\log(0.40)}\right] = 6 \ (\geq M \to N = 0)$$

When scheduler 160 schedules packets from flow 401 for transmission, the connection groupings it uses are: Tier1{C1}, Tier2{C2, C3}, Tier0{C4, C5}.

For flow 402 (T=80%), the calculated tier N for each connection is:

$$C1(p = 1\%): N = \text{CEIL}\left[\frac{\log(1 - 0.80)}{\log(0.01)}\right] = 1$$

$$C2(p = 5\%): N = \text{CEIL}\left[\frac{\log(1 - 0.80)}{\log(0.05)}\right] = 1$$

$$C3(p = 10\%): N = \text{CEIL}\left[\frac{\log(1 - 0.80)}{\log(0.10)}\right] = 1$$

-continued $$C4(p = 35\%): \ N = \text{CEIL}\left[\frac{\log(1 - 0.80)}{\log(0.35)}\right] = 2$$

$$C5(p = 40\%): \ N = \text{CEIL}\left[\frac{\log(1 - 0.80)}{\log(0.40)}\right] = 2$$

When scheduler 160 schedules packets from flow 402 for transmission, the connection groupings it uses are: Tier1{C1, C2, C3}, Tier2{C4, C5}.

In another embodiment, connection groupings (tiers) and related metrics to generate them (for example, T, p, and inferred information about the distribution of loss) can be customized, per data flow or data type (e.g., by the flow identifier 001). In one embodiment, certain statistics are generated per connection per flow, and provided to the scheduler 160 so it can make smarter decisions about packet transmission (component 004 of PFLC). The stats collected may differ per connection per flow.

The next paragraphs provide detailed descriptions of specific embodiments of component 004 of PFLC: efficient scheduling of packets onto the groups of connections in a manner that meets the flow reliability requirements.

In a simplified example embodiment, the monitored stats are packet and byte loss (and some RTT/retransmit timeout (RTO) translation) over fixed predetermined intervals, and it is done only per connection (not per flow). These loss stats are converted to tier and state values and these tier and state values feed into the scheduler 160 to help it decide which packets to transmit on which connection, how many times, and how often.

In another embodiment, the connection tiers may be set by a common set of rules, with the scheduler 160 loosening the restrictions on which tiers can be used by a given data flow. In yet another embodiment, a combination of the two above methods could be used.

The approach for determining how to utilize a connection for specific types of traffic can vary, as well. In one embodiment, if there are indications from the customer or the application about the nature of the transmission (e.g., as provided in control signals, overhead data), the system is configured to use lower tier connections for benefit both to the transmission (use cheaper but less reliable connections), and the rest of the network (preserving space on higher reliability connections for flows that require it).

In some scenarios, using lower tier connections may take more data by forcing more applications on lower reliability networks and might be more expensive because of the multiple re-transmissions required, or could be cheaper if the lower reliability network has lower costs.

In one example, for a transmission judged or indicated to be urgent, the system might be willing to spend extra to send duplicate info on unreliable networks, or for non-urgent, the system might be willing to incur some packet loss (especially if the data is cheap on the unreliable connection), in order to preserve capacity on the reliable networks. These additional costs can be charged by the routing device/system and tracked for later reconciliation. There can be varying amounts of redundancy added (e.g., spend a large amount to increase reliability significantly, or a smaller amount for less of an increase). A communicator of data packets may modify the desired reliability based on cost (e.g., 98%, 99%, 99.9% reliability or 99.99% reliability can have significant cost consequences).

Adjustments per connection (because it is the connection that is varying) are possible in some embodiments, and traffic being sent over the connection may dictate how aggressively the system manages the transmission.

According to some embodiments, the per-flow, per-connection tier assignments calculated by PFLC component 003 of the invention nominally correspond to the number of times that scheduler 160 schedules transmission of packets from a particular flow onto the connections belonging to that tier.

In another embodiment, the scheduler 160 is configured to implement a different sort order for the preferred sequence in which it uses the connections to transmit, on as granular as a per-packet basis, and one of the dimensions of the sort could be cost, among others. In this variation, instead of having the connections essentially "pull" packets from the scheduler 160 in bursts, (where implementing priority on multiple dimensions is very complicated) the scheduler 160 is configured to push the packets to the connections instead.

In another variation to manage cost, instead of a real-time sort, a simpler, method is proposed to obtain some of the benefits of cost optimization. For example, the scheduler 160 may establish a simple "max tier/max repeats" value for each connection (rather than the whole system), based on cost per packet. In this example, for an expensive link, the system may be configured to set a cap at tier X, so that even if it would be assessed as tier X+1 where they may be many other connections at X+1, X+2 etc., that the system would be satisfied to send on, the connection would be marked as unreliable, until it qualified for a tier that required fewer repeats. Practically, X could likely be a low number as the difference between one and two repeats on overall cost is much higher than between 9 and 10 repeats.

If, for example, an expensive connection is capped at tier X but in reality it belongs to tier X+M, it doesn't have to be considered unreliable. It could still be used in tier X+M as long as there are other connections there, such that the missing transmit attempts on the expensive connection (M, assuming that the system sent a packet X times on it) can be handled by other connections in that tier.

In some embodiments, the caps on repeats could be static, and they would be independent of what other connections are available and what traffic levels are at. In another embodiment, the caps could be dynamic and dependent on other monitored information (e.g., satellite capped at tier 1 if there are many other links available or traffic is low, otherwise it could be assigned to tier 2 (and create an absolute cap there), or adjust a maximum tier based on relative price differences between multiple connections). In this variation, the cost optimization is isolated on the tiering mechanism (and avoiding flow classification or a system-wide optimization of costs across all links).

This approach would not prevent the system from heavily using the expensive connection if it did qualify for a high tier (if it were the only tier 1 connection and had capacity, it would still use it even if a full cost analysis would have it choose a much cheaper connection measured at Tier 3) but it would increase the odds that when the link is used, the system is getting good financial/economic value from each packet sent on that connection (relative to the connection itself).

On the unreliability side, this approach can be in addition to backing off exponentially from transmitting on unreliable connections to further reduce cost. For example, this approach can include controlling the routing to back off even more aggressively on expensive connections, by creating "tiers of unreliability" with caps similar to what is described above, except relating to how often the system retests, and with how many packets.

There are other variations possible, for example, there is a spectrum between a simple approach and towards a full cost optimization with hyper-dynamic tiering via a real-time connection sort, access to real-time connection pricing, hints from applications or predictions from the flow classification engine etc. All of these approaches are contemplated in various embodiments herein. As noted above, the basic tier cap per link idea acts more as a "poor-man's cost optimization" in the context of the tiering of connections that can be used in simpler implementations.

Figure 5:
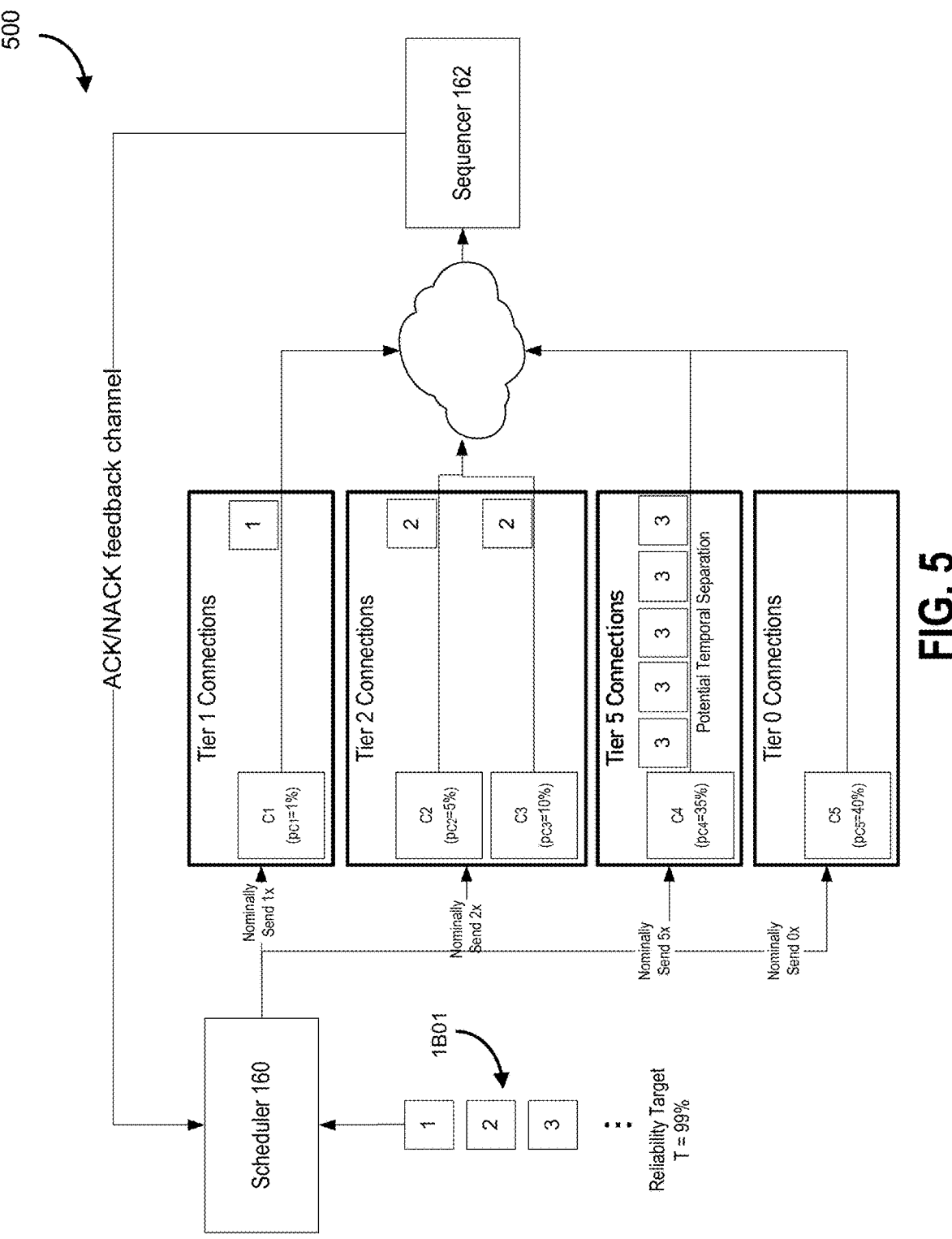
FIG. 5 is a diagram showing an example implementation, according to some embodiments.

FIG. 5 exemplifies such an embodiment, for a flow example 500 with T=99%, per-flow p values for each of the connections of $p_{C1}$=1%, $p_{C2}$=5%, $p_{C3}$=10%, $p_{C4}$=35%, $p_{C5}$=40%, and per-flow maximum tier limit M=6.

If scheduler 160 schedules a packet from this flow on Tier 1 (containing C1 only), it is transmitted on C1 exactly once, until either a positive acknowledgement (ACK) or negative acknowledgement (NACK) is received, or an RTO occurs.

If scheduler 160 schedules a packet from this flow on Tier 2 (containing C2 and C3), the packet is nominally transmitted twice, until either an ACK or NACK is received, or an RTO occurs. Based on the value of $p_{C2}$ and $p_{C3}$, preemptively transmitting twice (before the NACK or RTO) will cause the packet to probabilistically arrive at the destination with target reliability T, based on the relation $1-(p_{C3}p_{C3}) \geq T$.

Transmitting pre-emptively is the origin of the name PFLC. The scheduler 160 reduces the latency for real-time applications because there is no round-trip as is required for ARQ if the real-time flow and connection assessments are correct.

Scheduler 160 also reduces the bandwidth requirement compared to SMPTE-2022-7. The flow and connection assessments allow the duplicate packets to only be transmitted on C2 and C3 in this example, rather than all of C1, C2, and C3.

In some embodiments, the duplicate transmissions are preferred to be split, one over C2 and the other over C3, but if necessary, can both be over C2 or both over C3.

In some embodiments, duplicate transmissions over the same connection are separated temporally, depending on the loss profile/distribution. For example, a bursty loss distribution benefits from more temporal separation of the transmissions, whereas uniform loss does not.

In some embodiments, if an ACK is received before the second transmission occurs, the second transmission is skipped. This could occur if there is temporal separation between transmissions combined with low latency on the connection of the first transmission.

The approaches are the same with higher numbered tiers. For example, if scheduler 160 schedules a packet from this flow on Tier 5 (containing C4 only), the packet is nominally transmitted 5 times. The transmissions are pre-emptive (prior to a NACK or RTO), potentially separated temporally, and may be cut short if an ACK is received first.

In some embodiments, once scheduler 160 has selected a tier for a packet, the subsequent pre-emptive transmissions can only occur on connections in the same tier, a process referred to as "pinning" a packet to a tier.

In other embodiments, the subsequent pre-emptive transmissions can occur on any combination of the higher numbered tiers, until the relation $1-\Pi p_j \geq T$ is satisfied, where $p_i$ corresponds to any connection belonging to a tier greater than or equal to the tier that the packet was initially transmitted on, but less than the maximum tier M.

For example, a packet could be transmitted using a combination of tiers 2 and 4, once across a connection in tier

2 and twice on a connection in tier 4. This can be useful to avoid clustered reliability issues on one particular tier and allows for a more flexible approach of using available bandwidth or connectivity (e.g., for cost or load balancing reasons).

Transmitting a packet using a combination of tiers can also be useful to avoid clustered reliability issues on one particular connection (e.g., connection 7 could be the only connection in its tier, and be down for a period of time, all of the time in which the packet is being re-sent, so the reliability from sending multiple times is actually less than if the multiple transmissions of the packets were sent across independent connections).

Another potential benefit of transmitting a packet using a combination of tiers is where performance degradation occurs from overuse of a connection (e.g., heat) during a short timeframe.

In some embodiments, the scheduling rules and tier assignments described above are applied to bytes and byte ranges belonging to the flow, rather than packets.

An optional feedback channel can be provided (e.g., a high reliability/low latency channel) that may be a connection utilized for performance monitoring of the solution. The feedback channel is useful for perturbing the choices of connections, especially where the probabilities have correlations between them to try to encourage the use of independent probabilities where possible for establishing targets. The feedback channel may interoperate with time-stamped packets as well as timestamped acknowledgements.

Accordingly, the scheduler 160 can utilize multiple approaches of forwarding, such as unicasting, or broadcasting. The connections to be utilized can be identified for tracking in a broadcast domain, and the broadcast domain can be established for a particular tier of connections or all the connections chosen for sending a packet.

Other models of forwarding are possible. Further explanation of potential variations and approaches are described further in this specification. Various approaches are possible for determining a probability of success for a particular connection for use in tiering the connections.

An aspect of PFLC component 004 in some embodiments is the concept of connection states, RELIABLE, UNRELIABLE, and INDETERMINATE. These states and the transitions between them will now be described. Other states are possible and these states are shown as illustrative examples.

When a packet is transmitted by a group of connections that belong to a particular tier, a certain number of duplicates of this packet are also transmitted. The higher the tier, the higher the number of duplicates transmitted. This implies that the "goodput" (the actual useful throughput experienced by the application flow) of higher tiers is lower, because more bytes (i.e. more duplication, or more redundancy) are being sent overall to deliver the same information to the receiving side. There may be a 'tipping point' where the advantage of delivering the information to the receiving side with the selected target probability is outweighed by some disadvantages, including, but not limited to, the increasing cost of the transmission. For example, the user of a system may have provided a maximum limit that they are willing to pay for operation of the system. The limit could be converted into a byte or bitrate threshold, based on how the underlying connection charges for usage. For example:

Connection provider has a burstable billing model, charging based on the 95th percentile of throughput usage over a month (based on 5 minute average samples).

Customer has indicated that they are only willing to pay up to 100 Mbps of throughput under this billing model.

Application flow has a goodput demand of 50 Mbps, but due to the unreliability of the connection the retransmission approach would require duplicating every packet twice (each packet transmitted a total of 3 times). The total throughput usage would 150 Mbps in order to achieve a goodput of 50 Mbps, exceeding the customer's limit. Therefore this connection should not be used.

The byte or bitrate threshold, in some embodiments, is maintained as a data value in a data field of a data structure that is referenced for determining whether the system should utilize a connection or not. The data value may be utilized in a comparison for toggling a usage state of a connection. In the example above, the threshold data field would store 100 Mbps as a data value, and the throughput usage can be determined as 3×50=150 Mbps. As 150>100, the connection will not be used even if it is able to obtain the desired probability of transmission success (due to the over-usage of bandwidth). This is useful in situations where a balance is required to be established between efficient bandwidth usage and data communications reliability. A corresponding threshold data field can be tracked for each connection or group of connections.

As described below, the threshold can also be used to establish a maximum tier. The maximum tier can be established periodically to reduce the number of computations required at runtime to reduce computational load. According to some embodiments, a maximum tier is defined for a particular connection to prevent the system from using it beyond its tipping point. If a transmission event with a given delivery target probability requires using this connection (based on its drop probability) in a tier that is higher than its maximum tier, then the connection does not participate in this transmission event. For example, a tier could require seven retransmissions to achieve a requisite probability of successful communication, leading to an inefficient usage of bandwidth resources.

In one embodiment, the same maximum tier is assigned to all connections to simplify operation and increase predictability.

The measurements of network properties of a particular connection are only possible when this connection participates in transmission events. A particular connection needs to participate in enough transmission events in order for the measurements to stay up to date.

A connection may not be participating in transmission events due to the combination of its maximum tier and its drop probability. The scheduler 160 or the connection manager (e.g., connection controller) 154 may decide to force this connection to participate in some transmission events in order to make new measurements of the network properties of this connection. When the drop probability of this connection gets updated, the decision of whether it participates in transmission events or not can be re-evaluated.

A connection may also not participate in transmission events because the sender does not have enough data for transmission to keep all or any connections engaged. When enough data becomes available again and transmission on this connection should resume, the scheduler 160 or the connection manager 154 should take into consideration that no up-to-date measurements of the network properties of this connection are available when making new transmission decisions.

Similarly, a connection may also not be participating in transmission events due to configured priority routing preferences, which can deactivate lower priority connections, because higher priority ones have sufficient bandwidth to handle the priority data flow. In the absence of other traffic, this limits the system's knowledge about the lower priority connections, and scheduler 160 or connection manager 154 must take into account the stale observations of the connection properties.

In some embodiments, connections not participating in transmission events don't have a tier assigned (in code, for example, it may be implemented by setting the tier to 0, although that is not compatible with the mathematical definition of a tier). Once enough stats have been collected that indicate this connection can participate in transmission events, it can be assigned to a tier.

In one embodiment, each connection is assigned a state that reflects its current condition or operation status. A connection participating in transmission events is said to be in a RELIABLE state. A connection not participating in transmission events due to the combination of its drop probability and maximum tier is said to be in an UNRELIABLE state. A connection that does not have up-to-date measurements recorded is said to be in an INDETERMINATE state. As the transmission system continues to run, each connection can move between the three states.

In some embodiments, these connection states can vary on a per-flow basis, due to p, T, and latency requirements also varying per-flow. For example, a flow with a large T value and/or a low latency requirement might consider a particular connection to be UNRELIABLE, but this same connection could be considered RELIABLE for another flow with a small T value and/or no latency requirement.

However, some connection states may be shared by all flows. For example, a connection that contains stale observations in its time intervals may be considered INDETERMINATE for all flows, regardless of their T values.

In some embodiments, a connection in RELIABLE state is one that is assigned to a tier greater than or equal to Tier 1 and less than Tier M. A connection in UNRELIABLE or INDETERMINATE state is assigned to Tier 0 or Tier M, and used accordingly (primarily to transmit duplicates of packets transmitted on the reliable tiers).

The distinction between the UNRELIABLE and INDETERMINATE states is that an UNRELIABLE connection utilizes a backoff timer to reduce the frequency at which it transmits packets. The rationale is that a connection that has been definitively measured to be unreliable over all available measurement periods is likely to remain unreliable, so a backoff timer prevents excessive resource usage just to frequently re-measure the connection. The backoff timer still allows this periodic re-measurement, just at increasing intervals.

Figure 6:
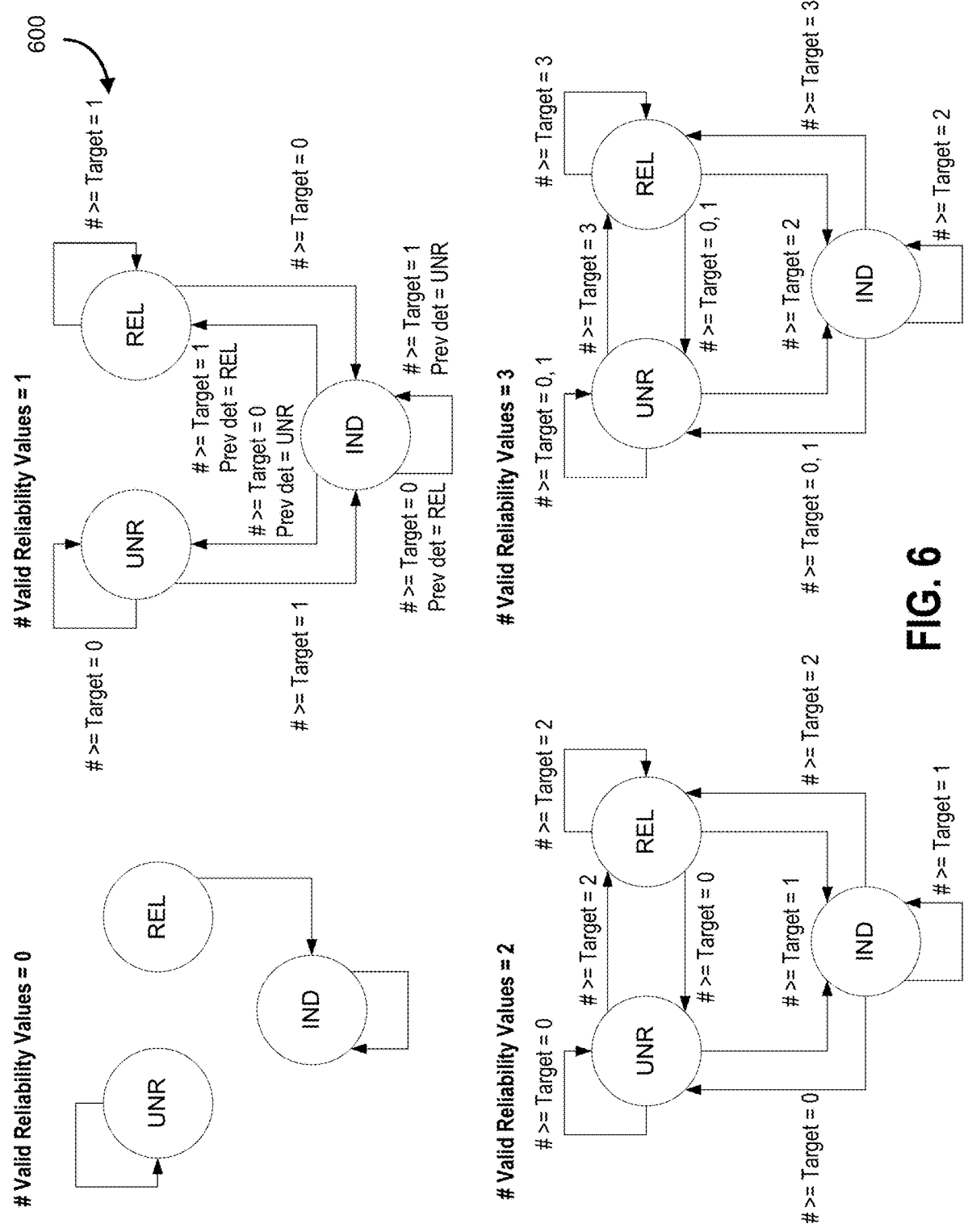
FIG. 6 is a diagram showing the state transitions between three states, according to some embodiments.

FIG. 6 is a diagram 600 that describe the state transitions of a particular connection according to an embodiment. Alternate approaches to state transitions are possible and there may be more, less, or different states.

As described earlier, the network properties of the connection are converted to loss percentage values (or other values indicative of communication or transmission reliability), which then are recorded over a number of intervals (e.g., three) time intervals and reduced to one or more values that are deemed representative of the time interval, or one or more time intervals.

It is assumed that the transmission system has a predetermined target reliability expressed as a percentage value. To compare the representative loss percentage value p of a time interval with the target reliability of the system, a reliability value for the time interval is calculated as 1−p.

The reliability value is considered valid if the time interval has recorded enough measurements; otherwise, it is considered invalid.

As shown in FIG. 6, state transitions 600 depend on the number of valid reliability values, how they compare to the target reliability of the system, the previous state of the connection, and the current state of the connection. Examples are shown from the number of valid reliability values being 0, 1, 2, and 3.

When the reliability values of all three time intervals are invalid, all observations for the connection are stale. The resulting state transitions are intended to be cautious, transitioning the connection out of the reliable Tiers. A connection in the UNRELIABLE or INDETERMINATE state remains in the same state. A connection in the RELIABLE state transitions to the INDETERMINATE state.

When the reliability value of only one time interval is valid, the following logic applies.

If that reliability value is greater than or equal to the target reliability, the state transitions are intended to be cautiously optimistic since there is a new observation indicating that the connection may be reliable. A connection in the UNRELIABLE state transitions to the INDETERMINATE state, disabling the backoff timer in order to obtain more observations and confirm the reliability as quickly as possible. A connection in the RELIABLE state remains in the same state. A connection in the INDETERMINATE state transitions to the RELIABLE state if its previous state was RELIABLE (cautious optimism that the previous reliability is now reconfirmed), but remains in the same state otherwise (was previously unreliable, so this one new observation is insufficient to cause a transition).

If that value is less than the target reliability, the new observation indicates the connection is unreliable. A connection in the UNRELIABLE state remains in the same state (fresh observation reconfirms the previous state). A connection in the RELIABLE state transitions to the INDETERMINATE state (cautious optimism that the unreliability is temporary, so attempt to obtain more observations as quickly as possible, without the backoff timer). A connection in the INDETERMINATE state transitions to the UNRELIABLE state if its previous state was UNRELIABLE (confirmation that its previous unreliability is now reconfirmed), but remains in the same state otherwise.

When the reliability value of only two time intervals are valid, the following logic applies.

If the reliability values of both time intervals are greater than or equal to the target reliability, a majority of the time intervals agree that the connection is reliable, so the connection transitions to the RELIABLE state.

If the reliability value of one time interval is greater than or equal to the target reliability and the reliability value of the other time interval is less than the target reliability, there is disagreement between the two intervals (e.g. the short interval might see burst loss that exceeds the reliability target, and the longer interval might see uniform loss that is below the reliability target). Due to this disagreement, the connection transitions to the INDETERMINATE state.

If the reliability values of both time intervals are less than the target reliability, a connection transitions to the UNRELIABLE state since the majority of the time intervals agree that the connection is unreliable.

When the reliability value of all three time intervals are valid, the following logic applies.

If the reliability values of all three time intervals are greater than or equal to the target reliability, the time intervals are unanimous in their agreement of reliability, so the connection transitions to the RELIABLE state.

If the reliability values of two time intervals are greater than or equal to the target reliability and the reliability value of the third time interval is less than the target reliability, a connection transitions to the INDETERMINATE state. There is disagreement between the three time intervals. Even though a majority think the connection is reliable, one explicitly believes it to be unreliable. More observations will be required as quickly as possible (no backoff timer) to resolve this disagreement.

If the reliability values of one or none of time intervals are greater than or equal to the target reliability and the reliability values of the other time intervals are less than the target reliability, a connection transitions to the UNRELIABLE state (majority of the time intervals believe the connection is unreliable).

In other embodiments, state transitions can have rules that differ from the ones described above. The state transitions may also take into account other information, such as:

Historic information, based on previous measurements and states, possibly beyond the windows described herein, including previous combinations of loss over the various time windows. Data on "rate of state changes", which can be used to predict stability of a given connection in a given state.

In an alternate embodiment, this historical tendency data is utilized to determine the rate and change in rate at which traffic is transmitted on a specific connection.

In a further embodiment, there is technical coordination between a downstream endpoint and the router system described herein. For example, every packet sent keeps track of what tier it was sent on and what the expected probability of arrival is. There can be meta data linked to the packet that is handled within the scheduler 160. In another embodiment, the data might be included/embedded in the packet itself.

This coordination information can be utilized to assess the end to end reliability of a connection, and can be particularly useful when the reliability data is outdated and needs to be updated, or there simply is no data.

In an example embodiment, the unreliable tier (e.g., tier 0) is utilized from time to time to send redundant packets to test reliability while potentially increasing the probability of success of the overall data communication.

The following paragraphs describe in more detail how some embodiments of PFLC component 004 use the concepts of connection tiers and connection states together to intelligently transmit packets over the available connections such that they are able to meet a flow's target reliability and latency constraints.

In some embodiments, scheduler 160 is tasked with providing a set of packets (a burst) to be sent immediately over a specified connection, subject to constraints on the total size (in bytes) of the burst or the number of packets in the burst and on the requirements of the packet's associated flow and the connection's determined tier. In other embodiments scheduler 160 is tasked with determining a set of packets to be sent next, and optimally assigning those packets to connections with available capacity.

In some embodiments, scheduler 160 will track a set of metadata for each packet that it has provided to a connection, until such time that the packet has been acknowledged as received by the peer, or until the packet has been deemed to be too old to be of use, even if it were subsequently resent.

In some embodiments such metadata includes the cumulative probability that the packet has been lost in transmission, the current in-flight count, the current tier over which it has been transmitted. These statistics allow scheduler 160 to determine if a given packet has been transmitted sufficiently to meet the requirements for reliable delivery.

Other embodiments may choose instead to use metadata that includes the count of times that the packet has been sent over each connection, using that information to calculate the estimated cumulative drop probability of the packet.

When scheduler 160 is tasked with generating a burst of traffic for a given connection, some embodiments may use the following algorithm: Step 1: resend any previously sent packets that do not meet the target reliability criteria, subject to the tier-based send restrictions (for example, a packet assigned to 2 that has only been sent once so far by the connections in that tier). Step 2: send new packets, subject to the tier-based send restrictions. Step 3: attempt to meet the minimum burst size by resending previously sent packets. Step 4: attempt to meet the minimum burst size by sending packets with dummy payloads.

In Step 1, some embodiments will repeatedly scan the list of sent packet metadata, searching for the packet with the highest cumulative drop probability p that does not meet the target reliability requirement (i.e. p>1−T). Prioritizing these packets helps to ensure (but does not guarantee) that all redundant copies of the packet have been sent (possibly over different connections) within a single RTT. Therefore, the loss of an earlier copy of the packet will be corrected by the subsequent arrival of the redundant packet in less time than ARQ would take to detect the loss and request a retransmit.

Such a packet is eligible if the packet's assigned tier matches the current connection's tier, or if the packet does not currently have a tier assigned. If the packet is eligible, its metadata is updated as follows: the packet's cumulative drop probability is updated to be the new cumulative drop probability, which is the old cumulative drop probability multiplied by the drop probability of the connection over which it is being scheduled; the packet's assigned tier is updated to be the same tier as the tier of the connection over which it is being scheduled; and the inflight counter is incremented.

Some embodiments may choose to limit the number of times a given packet will appear in the same burst in order to reduce the chance that the loss of a burst will impact the overall delivery of the packet (temporal separation of packets), choosing instead to allow the packet to be scheduled subsequently in a separate burst on either the same or a different connection in the same tier.

In Step 2, provided the size requirements of the burst have not yet been met, scheduler 160 would take a new packet from the input queue such that the requirements of the packet's associated flow would allow the packet to be sent over the current connection. For example, a flow with a maximum RTT limit can only be transmitted over connections with an RTT below this threshold.

Such a packet is assigned to the burst and assigned an initial cumulative drop probability equal to the connection's drop probability. The packet's tier is assigned to be the current connection's tier, provided the connection is RELIABLE, otherwise the packet's tier is left unassigned. The packet's inflight counter is also set to 1.

Some embodiments may choose to include the packet multiple times in this same burst (adjusting the cumulative drop probability as in Step 1), subject to the target reliability T and the burst size restrictions, while other embodiments may choose to limit the number of times a given packet can appear in the same burst in order to reduce the chance of a packet not being delivered due to the loss of the entire burst (temporal separation of packets).

In Step 3, even if there are no more packets available to schedule after the first two steps, the scheduler 160 may be configured to pad the burst up to a minimum number of packets or bytes (i.e., so that the network characteristic monitoring unit 161 can better determine the connection characteristics). In these cases, some embodiments of the system are adapted to repeatedly include inflight packets that have already met the target cumulative drop probability. The choice of packets may be ordered by some criteria, for example sorted by descending cumulative drop probability, which would help equalize the probability of packets arriving at the destination.

Similar to Step 1, such packets' cumulative drop probabilities are updated to include the current connection's drop probability. Unlike in Step 1, the assigned tier is not updated, and unlike in Step 1, neither the target reliability T nor whether the assigned tier matches the connection's tier are considered when choosing to include the packet for padding.

Some embodiments may choose to limit the number of times a packet can appear within the same burst (temporal separation of packets), and so a packet may be ineligible for inclusion as padding if it already appears in the burst through Steps 1 or 2. Because packets that appear as padding contribute to the packet's cumulative drop probability, it is possible that packets scheduled in this way may not strictly adhere to the general principal of sending packets n times over tier N, since sending a packet one or more times as padding may be equivalent, from a drop probability perspective, to sending it one or more times over a connection in the packet's assigned tier.

In Step 4, if the minimum requirements for the burst size cannot be satisfied in Step 3, then packets are generated with meaningless data ("dummy" packets) in their payloads, in order to satisfy the burst size requirements. Such packets are discarded after receipt by the peer and are not subject to metadata tracking within scheduler 160.

When scheduler 160 is notified that the peer has received an instance of the packet (over any connection), that packet's metadata is removed from tracking. When the scheduler 160 is notified that an instance of the packet has been lost, the packet's inflight counter is decremented. If the new value of the inflight counter is zero, and if the packet's cumulative drop probability p satisfies p≤1−T then if that packet's flow requirements allow the packet to be resent, then the packet's metadata is essentially reset (set to have a cumulative drop probability of 100%, an inflight count of 0, and no assigned tier). Otherwise, the packet is discarded and removed from tracking in scheduler 160.

As part of its flow requirements, a packet may contain an upper limit on its age (a hard deadline). Beyond this deadline, the flow may not require resending.

Scheduler 160 is also notified when the count of connections in a given tier transitions to zero. When this happens, all packets in the metadata queue that are assigned to that tier are marked as unassigned, since there are no longer connections in that tier to satisfy the resend requirements from Step 1. Packets marked as unassigned maintain the same drop probability as when it was in queue and this drop probability is used for future transmission decisions. For example, if a packet was originally assigned to Tier 2 and was only transmitted once, if Tier 2 becomes empty and the packet is subsequently reassigned to Tier 3, it may not require 3 transmissions to meet its target drop probability. The partial drop probability from the first Tier 2 transmission is preserved.

As a concrete example of some embodiments described in Steps 1-4 above, consider FIG. 7(A)-7(E). For the purposes of this example there is a single flow with target reliability set to T=98%, no latency constraint, and the maximum tier is set to M=3 (meaning only tiers <3 are treated as RELI-ABLE—the rest are Tier 0 and are either UNRELIABLE or INDETERMINATE).

Figure 7:
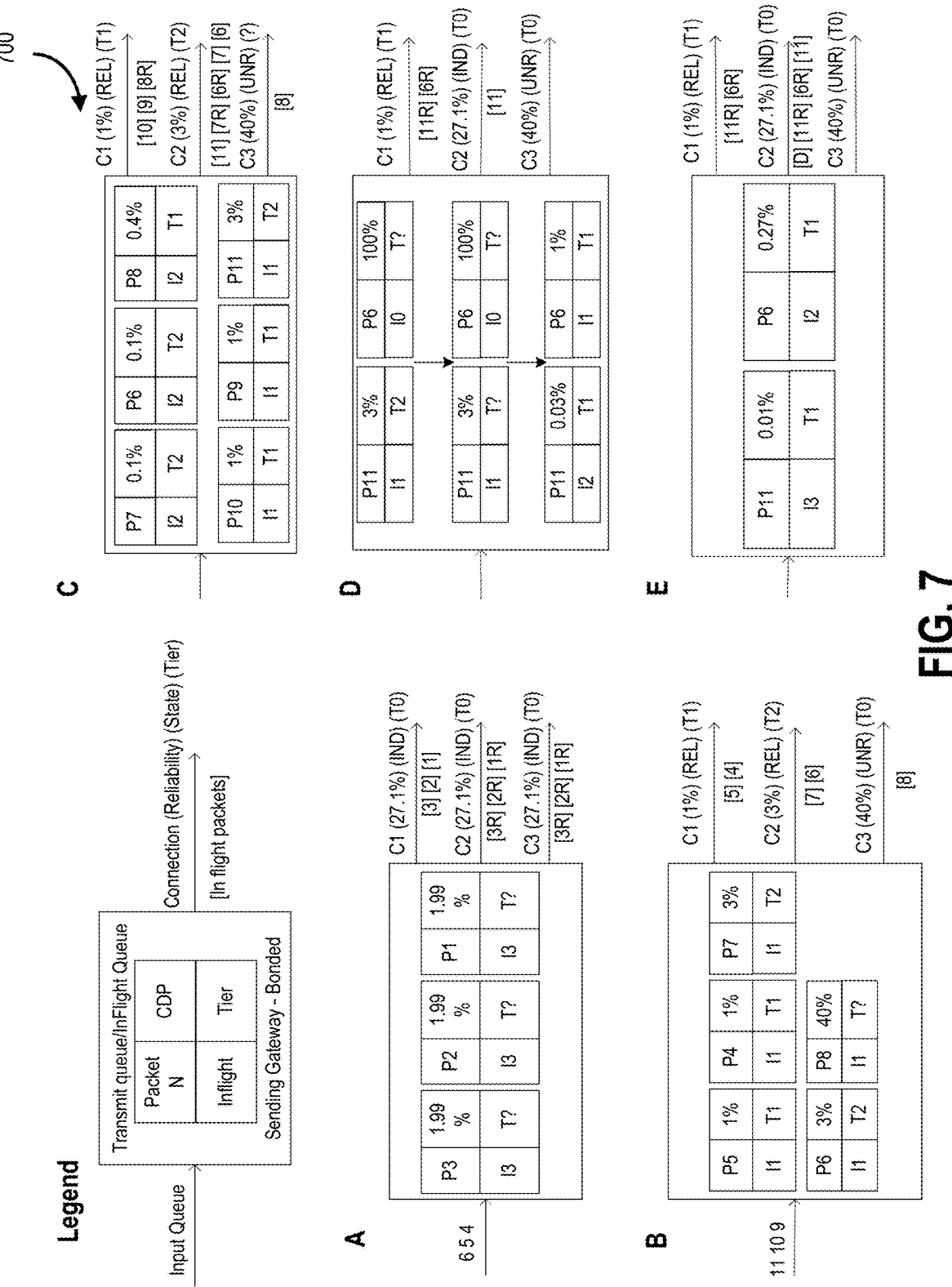
FIG. 7 is an example schematic of a coordinated approach for grouping connections, according to some embodiments.

FIG. 7(A) shows three connections C1, C2, and C3, each in an INDETERMINATE state with an assigned drop probability of 27.1%. The input queue initially has packets 1 through 6 waiting in queue, and the scheduler 160 is not currently tracking any packets. In this embodiment, the scheduler 160 tracks the packet data via a list ordered such that the packets with the highest cumulative drop probability appear to the right, and packets further right in the list are considered first for Steps 1 & 3 in the algorithm described above.

Connection C1 requests a burst of 3 packets. Since there are currently no previously sent packets, 1 does not yield any packets. In Step 2, the scheduler 160 de-queues packet 1 from the input queue, and assigns it a cumulative drop probability (CDP) 27.1% to match the p of C1. Its inflight count is set to 1, and its tier remains unassigned because C1 is not in a RELIABLE state.

The metadata queue then looks like:

[Packet=1, CDP=27.1%, Inflight Count=1, Tier=unassigned]

Step 2 proceeds until the burst requirement of three packets has been met by de-queuing packets 2 and 3 from the input queue and assigning them to the metadata queue similarly to how the first packet was processed. Since the burst requirements are met, Steps 3 and 4 are not executed. This leaves the metadata queue as follows:

[Packet=3, CDP=27.1%, Inflight Count=1, Tier=unassigned]
[Packet=2, CDP=27.1%, Inflight Count=1, Tier=unassigned]
[Packet=1, CDP=27.1%, Inflight Count=1, Tier=unassigned]

Next, connection C2 requests a burst of 3 packets. In Step 1, packet 1 appears at the end of the queue. It does not satisfy CDP<=1−T (27.1%≤2% is false), and the packet does not have an assigned tier, so it is eligible for resend. The packet's metadata is updated so the CDP becomes the old CDP multiplied by C2's p, so 27.1%×27.1%=7.34%, and the inflight count is incremented. The tier remains unassigned because C2 is not in a RELIABLE state. The metadata queue is now:

[Packet=1, CDP=7.34%, Inflight Count=2, Tier=unassigned]
[Packet=3, CDP=27.1%, Inflight Count=1, Tier=unassigned]
[Packet=2, CDP=27.1%, Inflight Count=1, Tier=unassigned]

Step 1 continues with packets 2 and 3, which then satisfies the burst requirements, so Steps 2-4 are skipped. The metadata queue is now:

[Packet=3, CDP=7.34%, Inflight Count=2, Tier=unassigned]
[Packet=2, CDP=7.34%, Inflight Count=2, Tier=unassigned]
[Packet=1, CDP=7.34%, Inflight Count=2, Tier=unassigned]

Next, connection C3 requests a burst of 3 packets. Each of the three packets on the metadata queue is eligible, so all are added to the burst and their metadata is updated. Again, the tier is left unassigned because C3 is not in a RELIABLE state. The metadata queue is now:

[Packet=3, CDP=1.99%, Inflight Count=3, Tier=unassigned]
[Packet=2, CDP=1.99%, Inflight Count=3, Tier=unassigned]
[Packet=1, CDP=1.99%, Inflight Count=3, Tier=unassigned]

This is the state depicted in FIG. 7(A). Notice that even though none of the packets were sent over a connection that was RELIABLE, the CDP of each packet meets the target reliability criteria, so a subsequent request to schedule packets on any of the connections would not yield packets from the metadata queue in Step 1. Also notice that packets 1, 2 and 3 are each in flight over connections C1, C2, and C3.

Scheduler 160 then receives acknowledgement that packets 1, 2, and 3 have been received by the peer, so their metadata is removed from the queue. The connection characteristics have also been updated by the connection controller 154 so that C1 now has a p=1%, is RELIABLE, and is in tier 1, C2 has a p=3%, is RELIABLE, and is in tier 2, and C3 has a p=40%, and is UNRELIABLE. Finally, packets 7, 8, 9, 10, 11 arrive at the input queue and are queued behind packets 4, 5, and 6.

Connection C1 then requests a burst of 2 packets. Since the metadata queue is empty, Step 1 is skipped. Step 2 de-queues packets 4 and 5 from the input queue and assigns them to the burst and updates the metadata queue with this information. Notably, these packets are all assigned to C1's tier, since C1 is RELIABLE. These packets satisfy the burst requirements, so Steps 3 and 4 are skipped. The metadata queue is now:

[Packet=5, CDP=1%, Inflight Count=1, Tier=1]
[Packet=4, CDP=1%, Inflight Count=1, Tier=1]

Connection C2 then requests a burst of 2 packets. In Step 1, none of the packets in the metadata queue are eligible to be included in this burst because all of them meet the target reliability requirement CDP≤1−T. Further, they are also assigned to tier 1, and C2's tier is 2, so they would not be eligible to be sent over C2 even if the packet's CDP did not satisfy the reliability requirement.

Step 2 is then applied to de-queue packets 6 and 7 from the input queue. These packets have their metadata updated accordingly, and since they satisfy the burst requirements, Steps 3 and 4 are skipped. The metadata queue is now:

[Packet=5, CDP=1%, Inflight Count=1, Tier=1]
[Packet=4, CDP=1%, Inflight Count=1, Tier=1]
[Packet=7, CDP=3%, Inflight Count=1, Tier=2]
[Packet=6, CDP=3%, Inflight Count=1, Tier=2]

Connection C3 then requests a burst of size 1. In Step 1, no packets are eligible for being sent over C3. Packets 4 and 5 are ineligible because they have already met the reliability criteria. While packets 4 and 5 do not meet the reliability criteria, they have been assigned to tier 2, so they are ineligible to be sent over C3 which has no assigned tier. Step 2 then de-queues packet 8 and updates the metadata accordingly, which satisfies the burst requirements and Steps 4 and 5 are skipped. The metadata queue is now:

[Packet=5, CDP=1%, Inflight Count=1, Tier=1]
[Packet=4, CDP=1%, Inflight Count=1, Tier=1]
[Packet=7, CDP=3%, Inflight Count=1, Tier=2]
[Packet=6, CDP=3%, Inflight Count=1, Tier=2]
[Packet=8, CDP=40%, Inflight Count=1, Tier=unassigned]

This brings us to the state depicted in FIG. 7(B), with packets 4 and 5 inflight over C1, packets 5 and 6 inflight over C2, and packet 8 inflight over C3.

Next, packets 4 and 5 receive an acknowledgement, and the tiers and p values for each connection remains the same.

The input queue still contains packets 9, 10, and 11, and the metadata queue is as follows:

[Packet=7, CDP=3%, Inflight Count=1, Tier=2]
    [Packet=6, CDP=3%, Inflight Count=1, Tier=2]
    [Packet=8, CDP=40%, Inflight Count=1, Tier=unassigned]

Next C1 requests a burst of 3 packets. In Step 1, the first packet is packet 8, which is eligible because it does not satisfy the reliability requirements and its tier is unassigned. The other packets in the queue do not satisfy the reliability requirement, but their assigned tier does match C1's tier, and so are not eligible for this burst. Packet 8 is added to the burst and the metadata is updated so that it's assigned tier is now 1, which give a metadata queue of:

[Packet=8, CDP=0.4%, Inflight Count=2, Tier=1]
    [Packet=7, CDP=3%, Inflight Count=1, Tier=2]
    [Packet=6, CDP=3%, Inflight Count=1, Tier=2]

Step 2: The system then de-queues packets 9 and 10 from the input queue and adds them to the burst. This satisfies the burst requirements and Steps 3 and 4 are skipped. The metadata queue is now:

[Packet=8, CDP=0.4%, Inflight Count=2, Tier=1]
    [Packet=10, CDP=1%, Inflight Count=1, Tier=1]
    [Packet=9, CDP=1%, Inflight Count=1, Tier=1]
    [Packet=7, CDP=3%, Inflight Count=1, Tier=2]
    [Packet=6, CDP=3%, Inflight Count=1, Tier=2]

Next, connection C2 requests a burst of size 3. In Step 1, packets 6 and 7 are eligible and are added to the burst, while packets 8, 9, and 10 are ineligible. In Step 2, the burst requirements are satisfied by de-queuing packet 11 from the input queue and adding to the burst. The input queue is now empty, and the metadata queue is observed as:

[Packet=7, CDP=0.1%, Inflight Count=2, Tier=2]
    [Packet=6, CDP=0.1%, Inflight Count=2, Tier=2]
    [Packet=8, CDP=0.4%, Inflight Count=2, Tier=1]
    [Packet=10, CDP=1%, Inflight Count=1, Tier=1]
    [Packet=9, CDP=1%, Inflight Count=1, Tier=1]
    [Packet=11, CDP=3%, Inflight Count=1, Tier=2]

Next C3 requests a burst of size 3, minimum size of 0. There are no eligible packets from Step 1, since all packets either meet the reliability requirements or are already assigned to a tier. In Step 2, the input queue is empty. Steps 3 and 4 are not required, since there is no minimum size associated with the burst. This state is depicted in FIG. 7(C), with packets 8, 9 and 10 inflight over C1, 6, 7, and 11 over C2, and packet 8 also inflight over C3.

Next, the scheduler 160 is notified that packets 7, 8, 9, and 10 are acknowledged by the peer, so their metadata is removed. The metadata queue is:

[Packet=6, CDP=0.1%, Inflight Count=2, Tier=2]
    [Packet=11, CDP=3%, Inflight Count=1, Tier=2]

One instance of packet 6 is marked as lost. The metadata queue becomes:

[Packet=6, CDP=0.1%, Inflight Count=1, Tier=2]
    [Packet=11, CDP=3%, Inflight Count=1, Tier=2]

Another instance of packet 6 is marked as lost. This results in the packet's metadata being reset (assuming the packet's Flow criteria allows the packet to be resent). The metadata queue is now:

[Packet=11, CDP=3%, Inflight Count=1, Tier=2]
    [Packet=6, CDP=100%, Inflight Count=0, Tier=unassigned]

As a result of these losses, connection C2's characteristics are adjusted so that it has a p=27.1% and is now INDETERMINATE. Since the transition to INDETERMINATE removes C2 from tier 2, the number of connections in tier 2 has gone to zero, and the scheduler 160 is notified of this. As a result, the scheduler 160 adjusts the metadata for any packet assigned to tier 2 so that it is now unassigned:

[Packet=11, CDP=3%, Inflight Count=1, Tier=unassigned]
    [Packet=6, CDP=100%, Inflight Count=0, Tier=unassigned]

Connection C1 now requests a burst of 3 packets. In Step 1, it finds packets 6 and 11 are eligible and adds them to the burst. Step 2 finds no packets on the input queue, and Steps 3 and 4 are not required because padding has not been requested. The metadata queue is now:

[Packet=11, CDP=0.03%, Inflight Count=2, Tier=1]
    [Packet=6, CDP=1%, Inflight Count=1, Tier=1]

These last three queue states are depicted in FIG. 7(D).

Next, C2 requests a burst of exactly 3 packets. Step 1 yields no packets because all packets in the metadata queue satisfy the reliability requirement. Step 2 yields no packets because the input queue is empty. Step 3 yields packets 6 and 11, and their metadata is updated. Step 4 yields a dummy packet that is not recorded in the metadata queue, which pads the burst to the required 3 packets. The metadata queue is now:

[Packet=11, CDP=0.01%, Inflight Count=3, Tier=1]
    [Packet=6, CDP=0.427%, Inflight Count=2, Tier=1]

The example ends with both remaining packets being acknowledged and the metadata queue being emptied.

Figure 8:
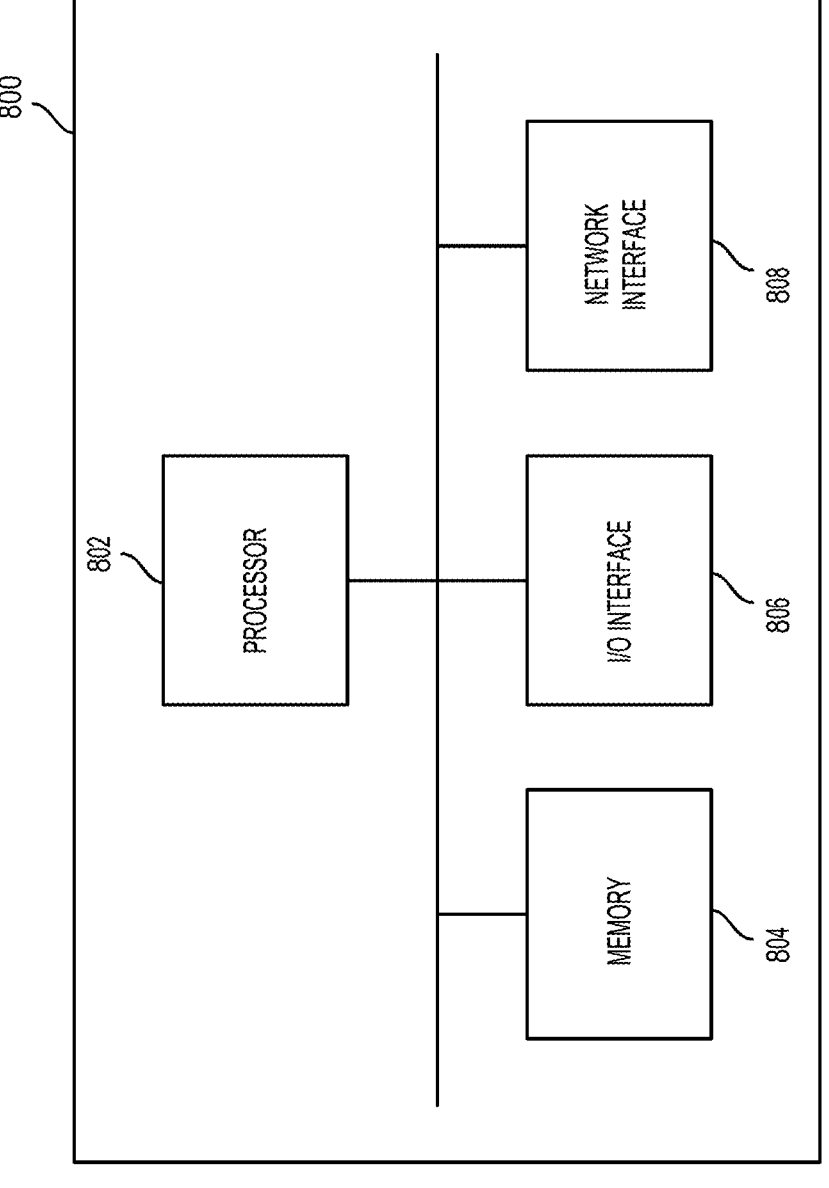
FIG. 8 is a block schematic of an example computing device, according to some embodiments.

FIG. 8 is a block schematic of an example computing device 800, according to some embodiments. Example computing device 800 can be utilized to implement portions or all of system 100, and is directed to a network computing device according to various embodiments (e.g., a router device, a gateway device, a network switch, a hub device) for controlling routing and/or usage of various network connections and/or communication paths. Example computing device 800 can include a processor 802 (e.g., a hardware processor, a microprocessor, a reduced instruction set processor, central processing unit), which interoperates with computer memory 804 (e.g., read only memory, embedded memory, random access memory), and may have one or more input/output interfaces 806 for receiving commands or displaying elements by way of a coupled display having rendered graphics thereon a graphical user interface. The computer memory 804 can store data, such as data sets for enabling computations, command instructions, data structures, such as routing tables and/or routing rules, observed network communication characteristics, among others. One or more network interfaces 808 are electrically coupled to the computing device 800 such that electronic communication is possible through the one or more network interfaces. As noted herein, the network interfaces 808 may be utilized to provide one or more network connections, over which transmission or communication of data packets can be coordinated such that a more efficient usage of communication resources is possible.

FIG. 9 is a diagram 900 depicting a physical computer server rack, according to some embodiments. In the computer server rack shown in FIG. 9, there are multiple networked computing components, including rack mounted computing appliances, such as a networked router, switch, hub, gateway, etc. In this example, the components interoperate with one another to controlling routing, for example, by establishing and/or periodically updating routing tables and/or routing rules. In another embodiment, the components interoperate to control routing by controlling network connections, routing data packets, etc., in accordance with the routing tables and/or routing rules.

As described herein, the approach is a technical, computational solution that can be implemented in the form of a physical data router or other networking device configured for controlling routing of communications of data packets. The device can include one or more processors operating in conjunction with computer memory, and the one or more processors may be coupled to data storage. Corresponding methods, and non-transitory computer readable media (e.g., diskette, solid state storage, hard disk drive) storing machine-interpretable instructions thereon (e.g., software which when executed by a computer processor, cause the processor to perform a method described herein in various embodiments).

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A network router computing device, the device comprising:

a processor coupled to computer memory and data storage, the processor configured to:

receive one or more data sets indicative of monitored network communications characteristics;

maintain, in a data structure stored on the data storage, a tiered representation of a plurality of connections segregated into a plurality of groups, each group established based at least on a minimum probability associated with a successful communication of a data packet across one or more connections of the plurality of connections residing within the group; and control a plurality of communications of a data packet such that the data packet is sent at least once across one or more connections of the plurality of connections such that, in aggregate, the plurality of communications cause the transmission of the data packet to satisfy a target probability threshold;

wherein the plurality of groups are organized into a plurality of corresponding tiers, each tier representing a number of times the data packet would have to be transmitted across any corresponding connections of the tier to achieve the target probability threshold; and wherein the plurality of communications include re-transmissions across connections of a tier of the plurality of tiers, wherein a number of re-transmissions are based on the number of times the data packet would have to be transmitted across corresponding connections of the tier to achieve the target probability threshold for the corresponding tier.

2. The network router computing device of claim 1, wherein the re-transmissions are conducted across different connections of the tier.

3. The network router computing device of claim 1, wherein the plurality of communications includes re-transmissions across connections of different tiers of the plurality of tiers.

4. The network router computing device of claim 1, wherein an additional group is an indeterminate group established for connections that do not have sufficient data for assessing reliability, or an additional group is an unreliable group established for connections that are indicated as below a threshold reliability for data communication.

5. The network router computing device of claim 4, wherein membership of the indeterminate group or the unreliable group is periodically modified to classify connections into the plurality of groups.

6. The network router computing device of claim 4, wherein connections of the plurality of groups is periodically monitored to shift membership into the indeterminate group or the unreliable group where connection data is stale or indicative of increased unreliability.

7. The network router computing device of claim 4, wherein the indeterminate group is utilized for the communications of a data packet using assigned reliability probabilities.

8. The network router computing device of claim 7, wherein the assigned reliability probabilities are periodically adjusted based on the monitored network communications characteristics.

9. The network router computing device of claim 4, wherein the connections for which a number of transmits or retransmits were required were greater than a threshold are transferred into the indeterminate group or the unreliable group.

10. The network router computing device of claim 1, wherein the processor is configured to maintain one or more state machines for classifying each connection of the plurality of connections.

11. A method for network communications, the method comprising:

receiving one or more data sets indicative of monitored network communications characteristics;

maintaining, in a data structure stored on the data storage, a tiered representation of a plurality of connections segregated into a plurality of groups, each group established based at least on a minimum probability associated with a successful communication of a data packet across one or more connections of the plurality of connections residing within the group; and controlling a plurality of communications of a data packet such that the data packet is sent at least once across one or more connections of the plurality of connections such that, in aggregate, the plurality of communications cause the transmission of the data packet to satisfy a target probability threshold;

wherein the plurality of groups are organized into a plurality of corresponding tiers, each tier representing a number of times the data packet would have to be transmitted across any corresponding connections of the tier to achieve the target probability threshold; and wherein the plurality of communications include re-transmissions across connections of a tier of the plurality of tiers, wherein a number of re-transmissions are based on the number of times the data packet would have to be transmitted across corresponding connections of the tier to achieve the target probability threshold for the corresponding tier.

12. The method of claim 11, wherein the re-transmissions are conducted across different connections of the tier.

13. The method of claim 11, wherein the plurality of communications includes re-transmissions across connections of different tiers of the plurality of tiers.

14. The method of claim 11, wherein an additional group is an indeterminate group established for connections that do not have sufficient data for assessing reliability, or an additional group is an unreliable group established for connections that are indicated as below a threshold reliability for data communication.

15. The method of claim 14, wherein the method further comprises periodically transmitting data packets across connections in the indeterminate group or the unreliable group, and wherein the periodic transmission of the data packets incorporates a backoff timer to reduce an overall system inefficiency.

16. The method of claim 14, wherein membership of the indeterminate group or the unreliable group is periodically modified to classify connections into the plurality of groups.

17. The method of claim 14, wherein connections of the plurality of groups is periodically monitored to shift membership into the indeterminate group or the unreliable group where connection data is stale or indicative of increased unreliability.

18. The method of claim 14, wherein the indeterminate group is utilized for the communications of a data packet using assigned reliability probabilities.

19. The method of claim 18, wherein the assigned reliability probabilities are periodically adjusted based on the monitored network communications characteristics.

20. The method of claim 14, wherein the connections for which a number of transmits or retransmits were required were greater than a threshold are transferred into the indeterminate group or the unreliable group.

21. A non-transitory computer readable medium storing non-transitory instructions, which when executed by a processor, cause the processor to perform a method comprising:

receiving one or more data sets indicative of monitored network communications characteristics;

maintaining, in a data structure stored on the data storage, a tiered representation of a plurality of connections segregated into a plurality of groups, each group established based at least on a minimum probability associated with a successful communication of a data packet across one or more connections of the plurality of connections residing within the group; and controlling a plurality of communications of a data packet such that the data packet is sent at least once across one or more connections of the plurality of connections such that, in aggregate, the plurality of communications cause the transmission of the data packet to satisfy a target probability threshold;

wherein the plurality of groups are organized into a plurality of corresponding tiers, each tier representing a number of times the data packet would have to be transmitted across any corresponding connections of the tier to achieve the target probability threshold; and wherein the plurality of communications include re-transmissions across connections of a tier of the plurality of tiers, wherein a number of re-transmissions are based on the number of times the data packet would have to be transmitted across corresponding connections of the tier to achieve the target probability threshold for the corresponding tier.

* * * * *